United States Patent
Kalbag

(10) Patent No.: US 8,538,399 B2
(45) Date of Patent: Sep. 17, 2013

(54) METHOD AND SYSTEM FOR NETWORK ASSISTED DISCOVERY OF FEMTO CELLS

(75) Inventor: Rohit Satish Kalbag, Bridgewater, NJ (US)

(73) Assignee: Cellco Partnership, Basking Ridge, NJ (US)

(*) Notice: Subject to any disclaimer, the term of this patent is extended or adjusted under 35 U.S.C. 154(b) by 33 days.

(21) Appl. No.: 12/965,452

(22) Filed: Dec. 10, 2010

(65) Prior Publication Data

US 2012/0149351 A1 Jun. 14, 2012

(51) Int. Cl.
*H04M 3/00* (2006.01)
(52) U.S. Cl.
USPC ......... 455/418; 455/404.1; 370/352; 370/332
(58) Field of Classification Search
USPC .................. 455/418, 404.1; 370/352, 332
See application file for complete search history.

(56) References Cited

U.S. PATENT DOCUMENTS

| | | |
|---|---|---|
| 2009/0052395 A1 | 2/2009 | Bao et al. |
| 2009/0094680 A1* | 4/2009 | Gupta et al. ............ 726/3 |
| 2009/0257429 A1 | 10/2009 | Osborn |
| 2010/0027510 A1* | 2/2010 | Balasubramanian et al. 370/332 |
| 2010/0041364 A1 | 2/2010 | Lott et al. |
| 2010/0085945 A1 | 4/2010 | Williams |
| 2010/0120394 A1 | 5/2010 | Mia et al. |
| 2010/0120447 A1 | 5/2010 | Anderson et al. |

* cited by examiner

*Primary Examiner* — Charles Shedrick

(57) ABSTRACT

Method and system for a femto serving switch system. A request for registering a wireless device with a femto cell environment is received. The wireless device is registered based on the request with respect to the femto cell environment. Information related to the femto cell environment and one or more applications is then obtained, based on which a femto discovery notification (FDN) is generated. Such generated FDN is then delivered to the wireless device to assist the wireless device to operate in the femto cell environment.

29 Claims, 15 Drawing Sheets

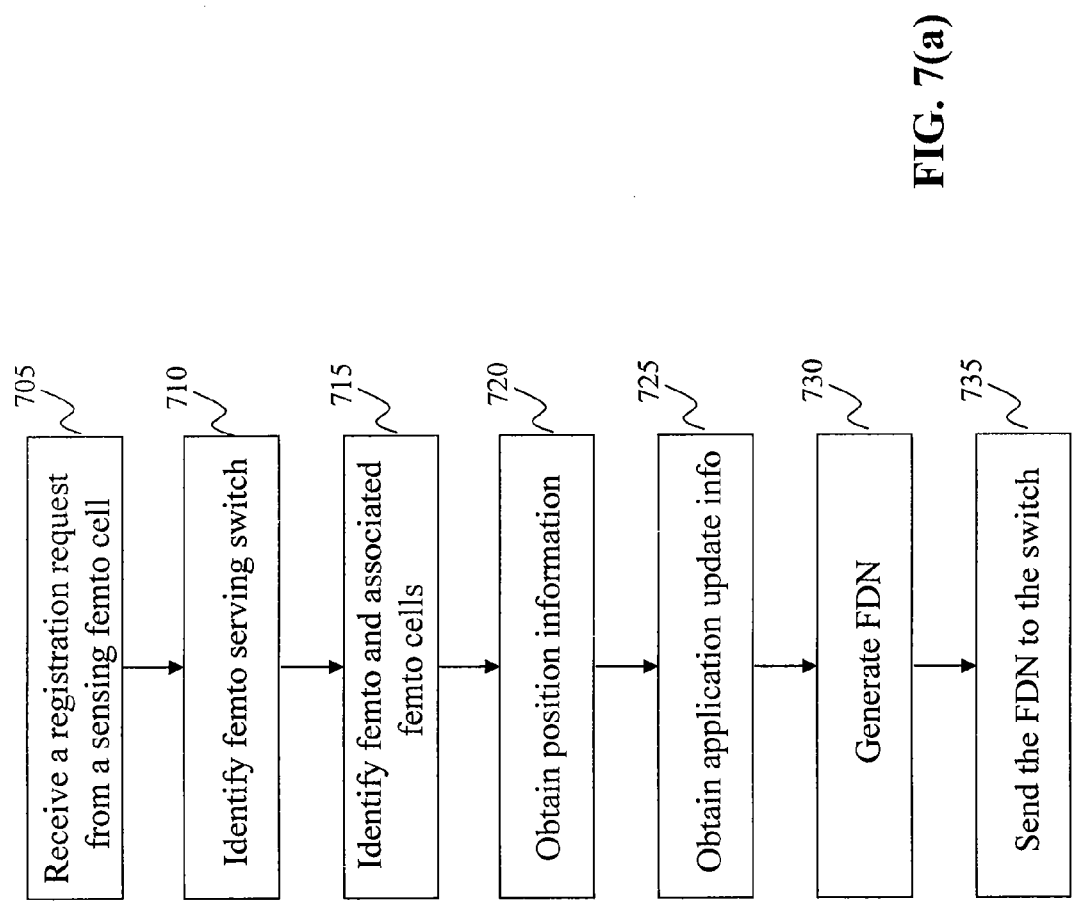

US 8,538,399 B2

METHOD AND SYSTEM FOR NETWORK ASSISTED DISCOVERY OF FEMTO CELLS

BACKGROUND

1. Technical Field

The present teaching relates to methods, systems, and programming for network detection and switching and systems incorporating the same.

2. Discussion of Technical Background

With the advancement of telecommunication technologies, information access via wireless means has become more and more ubiquitous, whether indoor or outdoors. Installation of distributed cell towers as well as the ability of network operators to handle calls from users serviced by other operators have made wireless communication increasingly seamless. However, situations still exist where users can not consistently have a quality connection. One of such situations is indoor cellular coverage. There may be a variety of reasons for poor reception in an indoor setting. For instance, in a building residing in, e.g., a densely populated region, signals between a cellular device and a tower may encounter many obstacles along the signal transmission path. Although signals may reach the intended destination, the strength of the signal may be so weakened that the received signal is not usable.

Efforts have been made to improve the quality of communication in such situations. For instance, a wireless network extender, a device often referred to as a femto cell, is a solution adopted to enhance indoor cellular coverage in order to provide more reliable wireless service. Such a wireless network extender or femto cell works like a miniature cell tower in an indoor environment (e.g., home or office). A femto cell usually is easy to install. For instance, it can be simply plugged into an existing Internet connection. The wireless network extender then communicates with its home operator's network via Internet connections. In this manner, a wireless device communicates with the femto cell, which then channels the communication back and forth between the wireless device and the operator's network via the Internet connection. With this solution, to a wireless device, a femto cell is almost indistinguishable from a macro base station.

Traditionally, to enable a wireless device to detect that it is being served by a femto cell, the wireless device is configured so that it is capable of recognizing a femto cell when it enters into the coverage area of a femto cell. This can be done by configuring the wireless device with identifiers for femto cells that are in deployment so that whenever the device enters an area in which any of the configured identifiers is detected, the device is aware that it is now in the coverage area of a femto cell. Such identifiers include radio frequency (RF) identifiers such as cell identifiers, system and network identifiers, PN offsets, and other information conveyed in RF to determine femto deployment.

The traditional solution is depicted in FIG. 1. A network configuration 100 includes a first network such as a cellular service network 120, a second network such as the Internet 140, an indoor environment 130, one or more wireless devices, e.g., device 110 (in motion) and 145. Wireless devices are connected via the first network 120, e.g., operated by network operator(s). The first network 120 includes a plurality of base stations, e.g., 125, 135, and a femto serving switch and support systems 160, which is responsible for handling femto cell operations. As can be seen, the wireless device 110 is configured to have identifiers designated to femto cells. In addition, in the indoor environment 130, there are femto cells (FC) 150 and 155 deployed, both of which are capable of communicating with a home router 170 connected to the second network or Internet 140.

In operation, when wireless device 110 is at a first position A, it communicates, e.g., with wireless device 145, via the first network or cellular service network 120. Signals from wireless device 110 are transmitted to a nearby base station, e.g., 125, and through the cellular service network 120, the signals are routed to wireless device 145 via, e.g., a different base station 135. When wireless device 110 travels from position A to position B, it may enter into a femto cell coverage area (e.g., the indoor environment 130). When the wireless device 110 detects, based on the configured identifiers for femto cells, that it enters into a femto cell coverage area, the subsequent communication may now be handled by a detected femto cell, e.g., 150. In this mode of operation, the wireless device 110 communicates with the femto cell 150, which communicates with the femto serving switch/support systems 160 via the home router 170 and the Internet connection 140. The signal exchanges between wireless device 110 and wireless device 145 are now relayed via femto cells, the femto serving switch/support systems, and the first network 120.

This conventional solution has some drawbacks. When the deployment of femto cells grows, more and more identifiers need to be dedicated to femto cells. More and more identifiers need to be configured in a wireless device. In addition, for a wireless device that has been configured with fewer identifiers, there is no easy way to update the configuration of such an existing device. Furthermore, the network operator currently has no means to provide a device with information related to specific femto cells associated with the device at any particular time. Therefore, there is a need to provide a better solution to assist a wireless device to operate in a femto cell coverage and a cellular network coverage.

SUMMARY

The teachings disclosed herein relate to methods and systems for network-based femto discovery and notification. In one example, a method, implemented on a machine having at least one processor, storage, and a communication platform for a femto serving switch system, receives a request for registering a wireless device within a femto cell environment and registers the wireless device with the femto cell environment. Then, information is obtained that relates to the femto cell environment and/or one or more applications that are supported by the femto cell environment. Based on the obtained information, a femto discovery notification (FDN) is generated and delivered to the wireless device to assist the wireless device to operate in the femto cell environment.

In a different example, a method, implemented on a machine having at least one processor, storage, and a communication platform for a femto serving switch system, receives, from a femto support system, a femto discovery notification (FDN) directed to a wireless device and analyzed the received FDN to identify a femto cell environment. Information relating to the femto cell environment is then obtained and used to modify the FDN to generate an updated FDN. The updated FDN is then delivered to the wireless device to assist the wireless device to switch between a wireless network and the femto cell environment.

In another example, a method, implemented on a machine having at least one processor, storage, and a communication platform for a femto support system, receives a request for registering a wireless device with a femto cell environment and identifies a femto serving switch system associated with the femto cell environment. Information related to the femto cell environment is then obtained and the wireless device is registered with the femto cell environment. A femto discovery notification (FDN) is generated based on the obtained information and delivered to the femto serving switch system.

In yet another different example, a method, implemented on a machine having at least one processor, storage, and a communication platform for a wireless device, which is capable of operating in a first and a second network environment, receives a message from a femto serving switch system, where the message includes a femto discovery notification (FDN) with information indicating that the device is presently operating under the coverage of the second network environment. The information in the FDN related to one or more applications capable of running on the wireless device under the coverage of the second network system is then analyzed to determine that the wireless device is no longer operating in the first network system. The status of the one or more applications on the wireless device is then modified in accordance with the information.

In a different example, a femto serving switch system comprises a receiver configured for receiving a request for registering a wireless device within a femto cell environment, a receiver configured for receiving a request for registering a wireless device within a femto cell environment, a device registration unit configured for registering the wireless device with the femto cell environment, a femto discovery notification (FDN) generator configured for obtaining information related to the femto cell environment and/or one or more applications that are supported by the femto cell environment and generating an FDN based on the obtained information, and a transmitter configured for delivering the FDN to the wireless device to assist the wireless device to operate in the femto cell environment.

In another different example, a femto serving switch system includes a femto discovery notification (FDN) receiver configured for receiving, from a femto support system, an FDN directed to a wireless device, an FDN analyzer configured for analyzing the received FDN to identify a femto cell environment, one or more information retrieval units configured for obtaining information relating to the femto cell environment, an FDN modifier configured for modifying the FDN based on the information obtained to generate an updated FDN, and a transmitter configured for delivering, to the wireless device, the updated FDN to assist the wireless device to switch between a wireless network and the femto cell environment.

In a different example, a femto support system comprises a network interface configured for receiving a request for registering a wireless device with a femto cell environment, a femto switch identifier configured for identifying a femto serving switch system associated with the femto cell environment, a femto cell identifier configured for obtaining information related to the femto cell environment, a device registration unit configured for registering the wireless device with the femto cell environment, a femto discovery notification (FDN) generator configured for generating an FDN based on the obtained information, and a transmitter configured for delivering the FDN to the femto serving switch system.

In yet another different example, a wireless device comprises a femto discovery notification (FDN) receiver configured for receiving a message from a femto serving switch system, where the message includes an FDN with information indicating that the device is presently operating under the coverage of the second network environment, an FDN analyzer configured for analyzing information in the FDN related to one or more applications capable of running on the wireless device under the coverage of the second network system and determining that the wireless device is no longer operating in the first network system, and a device interface controller configured for modifying the status of the one or more applications on the wireless device in accordance with the information.

Other concepts relate to unique software for implementing the routing traffic over multiple alternative network interfaces. A software product, in accord with this concept, includes at least one machine-readable medium and information carried by the medium. The information carried by the medium may be executable program code data regarding parameters in association with local policies, such as the preferences in selecting a specific network when multiple networks are accessible, priority of preferences, etc.

In one example, a machine readable and non-transitory medium having information recorded thereon for a femto serving switch system, where when the information is read by the machine, causes the machine to receive a request for registering a wireless device within a femto cell environment, register the wireless device with the femto cell environment, obtain information related to the femto cell environment and/or one or more applications that are supported by the femto cell environment, generate a femto discovery notification (FDN) based on the obtained information, and deliver the FDN to the wireless device to assist the wireless device to operate in the femto cell environment.

In a different example, a machine readable and non-transitory medium having information recorded thereon for a femto serving switch system, where when the information is read by the machine, causes the machine to receive, from a femto support system, a femto discovery notification (FDN) directed to a wireless device, analyze the received FDN to identify a femto cell environment, obtain information relating to the femto cell environment, modify the FDN based on the information obtained to generate an updated FDN, and deliver, to the wireless device, the updated FDN to assist the wireless device to switch between a wireless network and the femto cell environment.

In another example, a machine readable and non-transitory medium having information recorded thereon for a femto support system, where when the information is read by the machine, causes the machine to receive a request for registering a wireless device with a femto cell environment, identify a femto serving switch system associated with the femto cell environment, obtain information related to the femto cell environment, register the wireless device with the femto cell environment, generate a femto discovery notification (FDN) based on the obtained information, and deliver the FDN to the femto serving switch system.

In yet another example, a machine readable and non-transitory medium having information recorded thereon for a wireless device, where when the information is read by the machine, causes the machine to receive a message from a femto serving switch system, where the message includes a femto discovery notification (FDN) with information indicating that the device is presently operating under the coverage of the second network environment, analyze information in the FDN related to one or more applications capable of running on the wireless device under the coverage of the second network system, determine that the wireless device is no longer operating in the first network system, and modifying the status of the one or more applications on the wireless device in accordance with the information.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 7(a) and 7(b) are flowcharts of exemplary processes in which a femto support system operates to assist in switching a wireless device between a cellular service network and a femto cell environment;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to a framework designed and implemented in a network environment and a mobile device to enhance the ability of the mobile device to operate in switched cellular service network and femto cell environment. More specifically, the present teaching relates to methods, systems, and program products of a networked framework in which a mobile device's presence can be detected by femto cells and information may be sent to facilitate the mobile device to operate in both a cellular service network and a femto cell environment in a more dynamic and effective manner.

Femto cells can be deployed to serve as presence detectors or sensors. When the presence of a wireless device is detected by a femto cell (which may indicate that the wireless device is entering an area with femto cell coverage), the femto cell notifies a femto serving switch system or a femto support system via network connections (e.g., a router in the locale where the femto cell is deployed). Upon receiving the notification, the femto switching system may send a femto discovery notification (FDN) to the wireless device. The femto switching system may not send a femto discovery notification (FDN) to the wireless device if the purpose of the sensing femto cell is solely to detect the presence of the device without alerting the user. The FDN may include certain information such as information related to femto cells in the region, or applications supported only in the femto cell environment of that particular locale. Upon receiving the FDN, the wireless device may analyze the FDN in order to react accordingly by, e.g., activating or waking up applications supported only in the particular femto cell environment the wireless device is entering, changing the device interface to allow a user to interact with the newly activated applications, registering neighboring femto cells, or deactivating or hibernating applications that run only in a home operator's cellular network. When a wireless device leaves a femto cell environment and goes back to a cellular service network, the wireless device may also perform various actions to adapt to the cellular service network environment.

Figure 2:
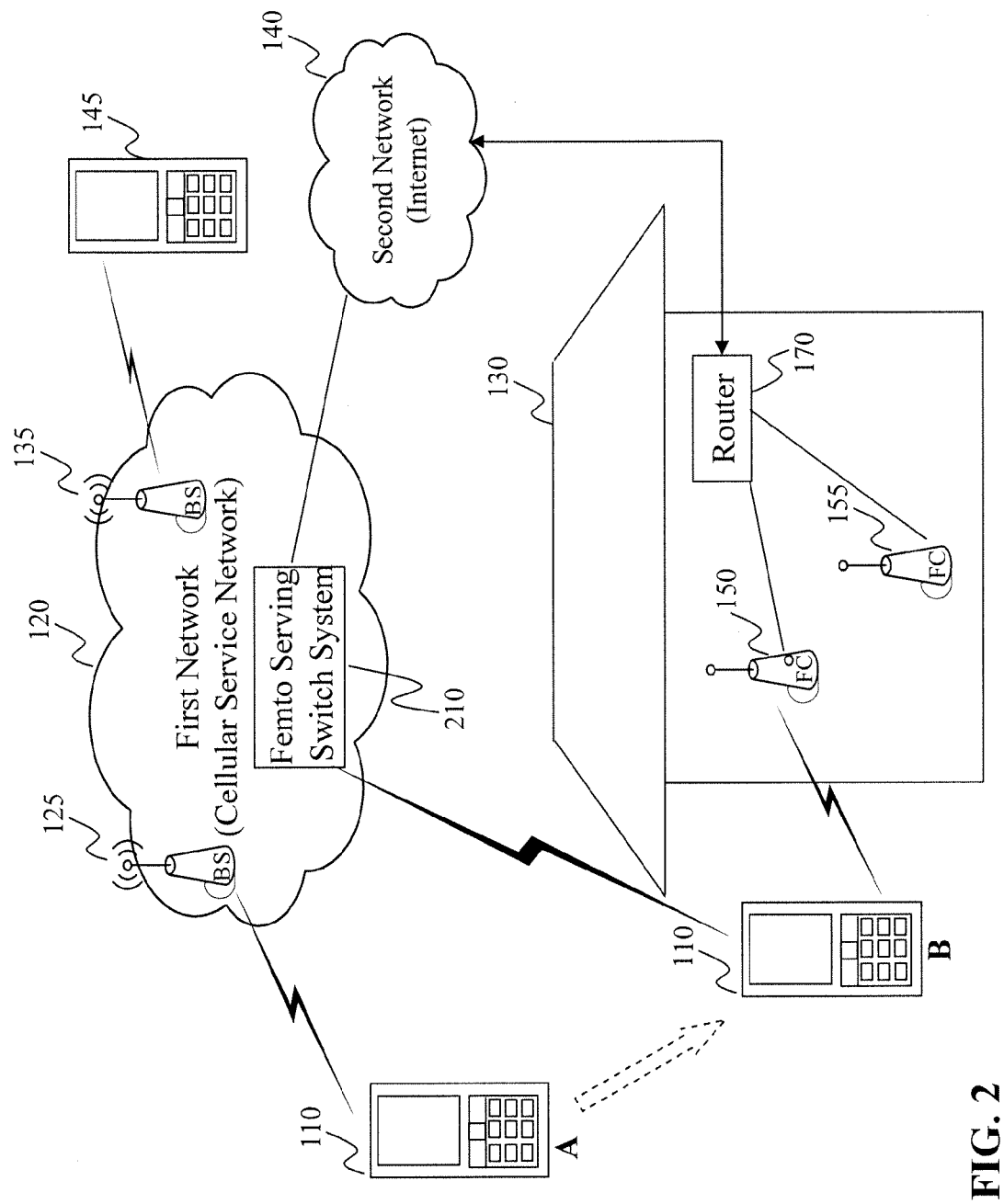
FIG. 2 shows a network configuration in which wireless devices interface directly with a femto serving switch system when it is switched from/to a cellular service network to/from a femto cell environment.

FIG. 2 shows a network configuration 200 in which a wireless device interfaces directly with a femto serving switch system for switching between a cellular service network and a femto cell environment. Network configuration 200 includes a first network 120 having a plurality of base stations (or cell towers) 125, . . . , 135 and at least one femto serving switch system 210. The base stations connect different wireless devices 110, . . . , 145. The femto serving switch system 210 may be distributed geographically and each may be responsible for handling the hand-off related operations for wireless devices to switch between the first network 120 and a femto cell environment located within the geographical reach of the femto serving switch system 210. The first network 120 may correspond to a cellular service network operated by, e.g., a service provider of wireless communications. The network configuration 100 also includes a second network 140, such as the Internet, that connects between a femto cell environment 130 and the first network 120. The femto cell environment 130 may correspond to an office building or a private home and include a router 170 and one or more femto cells, 150, . . . , 155.

The router 170 is provided to facilitate a connection between a femto cell (e.g., 150) and the second network 140. The femto cells 150, . . . , 155 may be deployed to enhance wireless services at locale 130. To facilitate the hand-off between the first network 120 and the femto cell environment 130, some of the deployed femto cells may be configured to have the ability to detect the presence of a wireless device within the coverage of the femto cell environment. For instance, when wireless device 110 travels from position A to position B, a femto cell, e.g., 150, may detect that the wireless device 110 is now within the coverage range of the femto cell environment 130, if the femto cell 150 is configured to serve also as a presence detector.

The femto cells deployed in locale 130 are connected to router 170, which is also connected to the second network 140. Through this connection, a femto cell can communicate with the femto serving switch system 210. For example, when femto cell 150 detects the presence of wireless device 110, it informs the femto serving switch system 210, via router 170 and the second network 140. When the femto serving switch system is notified of the presence of wireless device 110 within the coverage of the femto cell environment 130, the femto serving switch system 210 generates an FDN with relevant information and sends the FDN to the wireless device 110 via a message in a form such as a short message service (SMS). As the device 110 is in the Femto cell coverage, the SMS will travel through second network 140, the router, Femto cell 150 and to the device 110.

Information included in the FDN may include a variety of information. For instance, it may include a version indicator, security information, and information about a host femto cell and neighboring femto cells in the same vicinity, and extensions, if any, that carry proprietary or enhanced information. The host femto cell may or may not be the femto cell that detects the presence of the wireless device. The neighboring femto cells may be identified based on a database of recorded femto cell identifiers as the ones that are deployed in the same locale. Such neighboring femto cell information may be used by the wireless device to detect, in some implementations, when it is leaving a femto cell environment. The security information includes security certificate, digital signature, security hash or other indication of means used to secure the content and identifying that a sender corresponds to the service provider beyond repudiation. Information related to the host femto cell may include a geographic position of the host femto cell, e.g., the latitude and longitude, the RF identifier of the host femto cell, the services offered by the host femto cell and corresponding capabilities, and/or information about a macro base station and its position so that it can be contacted to assist the wireless device to position itself. Similar information for each of the neighboring femto cells may also be provided.

An FDN can be sent to a wireless device in different ways. In some implementation, an FDN may be sent in the form of a short message service (SMS)/enhanced messaging service (EMS). In another implementation, an FDN may be sent to a wireless device such as a data-session always-on smart phone via social networking updates such as twitter tweets, facebook updates, or instant messaging, etc. In addition, an FDN may be sent at different times. For example, in some implementations, an FDN may be sent to a wireless device as soon as the device registers with the femto network switch. Another possible timing is to periodically send, e.g., via SMS/EMS, a broadcast about the femto. It is noted that an FDN is, in general, light weight so that its generation and transmission does not bog down the normal system operations. In addition, it is understood that any known and future developed transmission modes/means may be used to carry an FDN in order for it to be delivered to a wireless device destination.

In the exemplary implementation shown in FIG. 2, an FDN to be transmitted to a wireless device is generated by the femto serving switch system 210. When a wireless device, e.g., 110, receives an FDN, it may then behave in accordance with the information contained in the FDN. An FDN-specific processing application deployed on the wireless device may analyze the information contained in the FDN and direct or control the wireless device to perform actions appropriate in a femto cell environment. For instance, information in an FDN that describes the capabilities of each femto cell in the femto cell environment may be used to invoke or wake up certain applications that are only supported by some femto cells in the particular femto environment. Such applications may be put in a sleep mode when the wireless device is operating in a cellular service network and be awakened whenever the device enters into a femto environment having femto cells that support such applications.

In addition, the FDN processing application may extract certain information from the FDN and pass on such information to some applications that are always on, e.g., certain social-networking type of applications. In some implementations, an FDN processing application may include information that provides specific application programming interfaces (APIs) so that other applications running on the wireless device can obtain information contained in the FDN. In this way, information contained in an FDN may be relayed in a network-assisted manner to applications running on the wireless device. In some implementations, an FDN processing application may expose an API for applications to subscribe to an FDN so that the wireless device can notify such subscribed application of any information contained in the FDN whenever it is received and/or assimilated.

The FDN processing application residing on the wireless device may be designed to take actions based on the received FDN. For instance, the FDN processing application may change the coverage icons to indicate that coverage is being provided by a femto cell environment. Such an action may also be performed by a different application based on relevant information received from the FDN processing application. The FDN processing application may also be designed to have the ability to interface with the radio processing and positioning aspects of the wireless device based on, e.g., content contained in the FDN, to, for example, handle radio handoffs between different femto cells. Details related to the FDN processing application will be provided in reference to FIGS. 8(*a*) and 8(*b*).

In those implementations, when a wireless device (e.g., 110) enters into a femto cell environment 130 (and leaves the first network 120) and is detected, the wireless device may then behave in accordance with the information contained in the FDN provided to the wireless device in a network-assisted manner. In this way, the wireless device is directed in terms of how to behave based on information from a bigger context. In addition, such an operation mode makes it scalable because it is no longer necessary to configure a wireless device with identifiers of all femto cells. This mode of operation also makes a wireless device more flexible in terms of adaptively offering services or applications in each locale in accordance with what the femto cells in that locale support.

Figure 3:
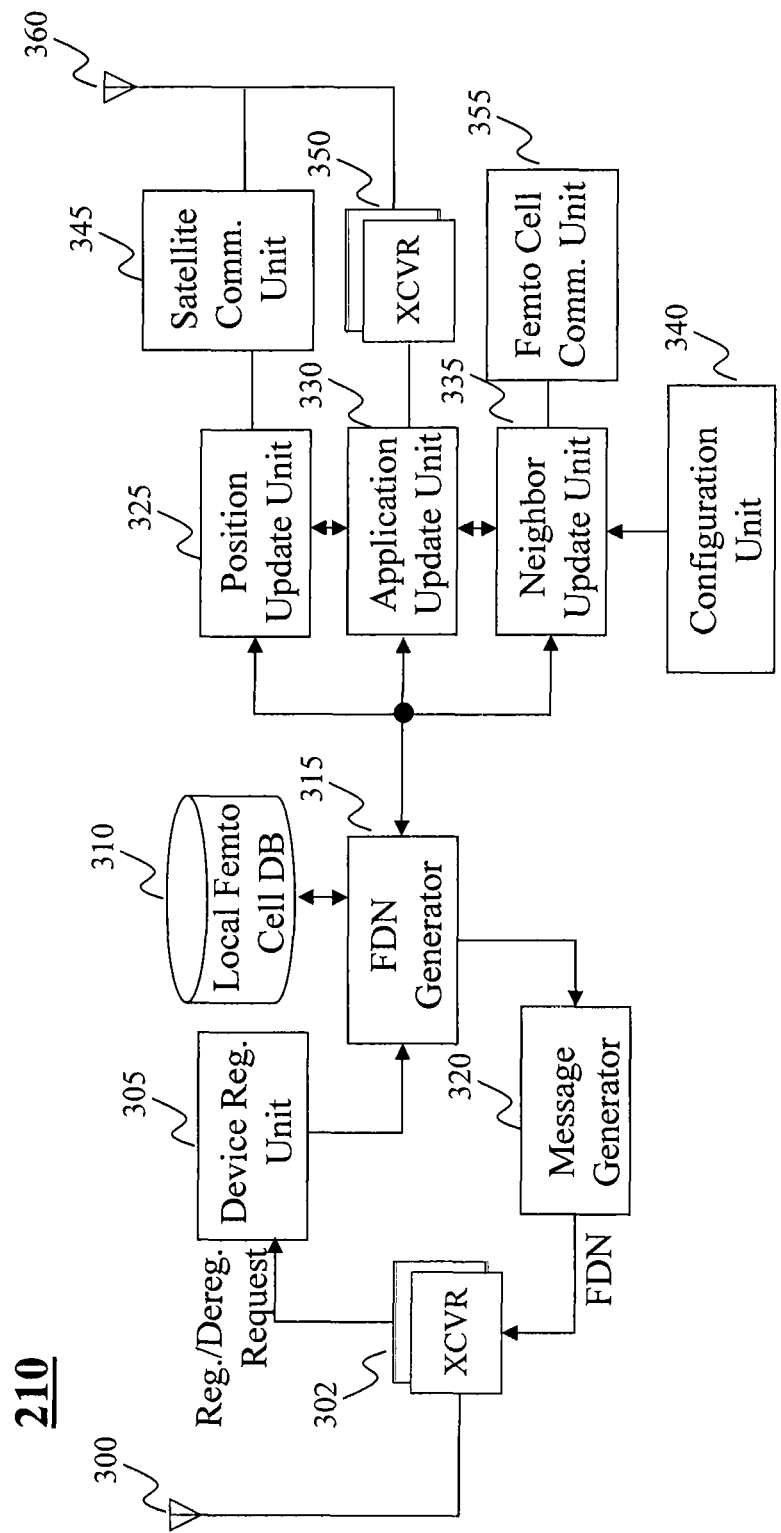
FIG. 3 depicts an exemplary system diagram of a femto serving switch system.

In the exemplary implementation depicted in FIG. 2, upon detecting a wireless device entering into a femto cell environment, a presence detection femto cell, e.g., 150, notifies the femto serving switch system 210, via router 170 and the second network 140, of the discovery of a wireless device in a particular femto cell environment 130. When the femto serving switch system 210 receives such a notification, it generates an FDN and sends the FDN to the wireless device, having the FDN packed with information that is specific to the particular femto cell environment 130. FIG. 3 depicts an exemplary system diagram of the femto serving switch system 210, which includes a device registration unit 305 for registering/deregistering a wireless device with respect to a specific femto cell environment, an FDN generator 315 for generating an appropriate FDN, and a message generator 320 that packages the generated FDN in some carrier form and transmits it to the wireless device. The device registration/deregistration unit 305 may receive a notification, via a transceiver 302 connected to the Internet, from a presence sensing femto cell positioned in a particular femto cell environment about detecting a wireless device in that femto environment. The identification of the detected wireless device, the identifier of the presence sensing femto, or the identifier of the underlying femto cell environment may be sent to the device registration/deregistration unit 305 for proper registration/deregistration. The registration and/or deregistration record with respect to different wireless devices may also be recorded in a database (not shown).

To facilitate generation of an FDN, the femto serving switch system 210 also includes a local femto cell database 310, which records configurations of different femto cell environments in the network. Information contained in such a database may include the identifiers of all femto cells, versions of such femto cells, identification of the type of each femto cell (e.g., presence of detection femto cell or application support femto cell, etc.), their groupings, i.e., which femto cells are grouped together to form one femto cell environment, and relationships among femto cells such as neighboring relationships.

In generating an FDN, the femto serving switch system 210 may identify other relevant information to be included in the FDN. To facilitate that, the femto serving switch system 210 may include a number of components each of which may be responsible for gathering or generating relevant information. For instance, a position update unit 325 may be responsible for obtaining the geographical location of each femto cell to be included in the FDN. Such geographical location of a femto cell may be represented as its latitude and longitude, obtained via, e.g., a satellite communication unit 345 through an antenna 360. The femto serving switch system 210 may also include an application update unit 330, which may be responsible for receiving information, via transceiver 350 connected to the Internet, regarding applications to be offered by certain types of femto cells. Such information may be dynamic in the sense that, e.g., applications supported may change and even if supported, networked upgrades may be available.

The femto serving switch system 210 may also include a neighbor update unit 335, which may gather information related to the neighboring femto cells. For instance, although the local femto cell database 310 may store information about the configuration of femto cells (e.g., who is nearby to whom and which ones form a group as a local femto cell environment, etc.), such configuration may change over time. For instance, through a configuration unit 340, an administrator or service operator may dynamically change the configuration. Different reasons exist for such changes. For example, a femto cell might be decommissioned due to performance and replaced with a new femto cell which may be a different type or support different applications. In this case, the configuration unit 340 may communicate with the neighbor update unit 335 about such changes. In addition, to avoid sending failed femto cell information to a wireless device, the neighbor update unit 335, in this case, may communicate with each femto cell designated as belonging to a group of femto cells for a particular locale, via the femto cell communication unit 355, to ensure that each such femto cell is working properly. If any of such femto cells is not functioning correctly, the neighbor update unit 335 may inform the FDN generator 315 so that such failed femto cell and its relevant information will not be transmitted to a wireless device. When the FDN generator 315 receives such information, it may then adjust what is to be included in the FDN. For instance, it may accordingly not include the femto cell in a list of neighboring femto cells. In addition, the FDN generator may also act by not including any information related to applications supported by the failing femto cell from the FDN.

When the FDN generator 315 receives information from different sources (local femto cell database 310, the position update unit 325, the application update unit 330, and the neighbor update unit 335), an FDN is generated based on the received information. To deliver the FDN to a registered/deregistered wireless device, the FDN may be packaged in a particular form for the delivery. This may be achieved by the message generator 320, which takes information to be included in an FDN as input (from the FDN generator 315), generates a carrier message in an appropriate form, and transmits the message containing the FDN to a designated wireless device. It is noted that the message generator 320 may be dynamically re-configured based on the type of the wireless device (not shown). That is, depending on the receiving capability of a wireless device, the message generator 320 may adapt to a certain form of message based on which an FDN may be packaged and delivered. For instance, different types of wireless devices may support different standards of communication so that FDNs sent to those different types of wireless devices are to be formatted in accordance with the respective standards each support and delivered in a form that can be properly received and decoded on the recipient wireless devices. Although not shown, the femto serving switch system 210 may include other components capable of performing additional functionalities, some of which may not be related to the present teaching.

Figure 4A:
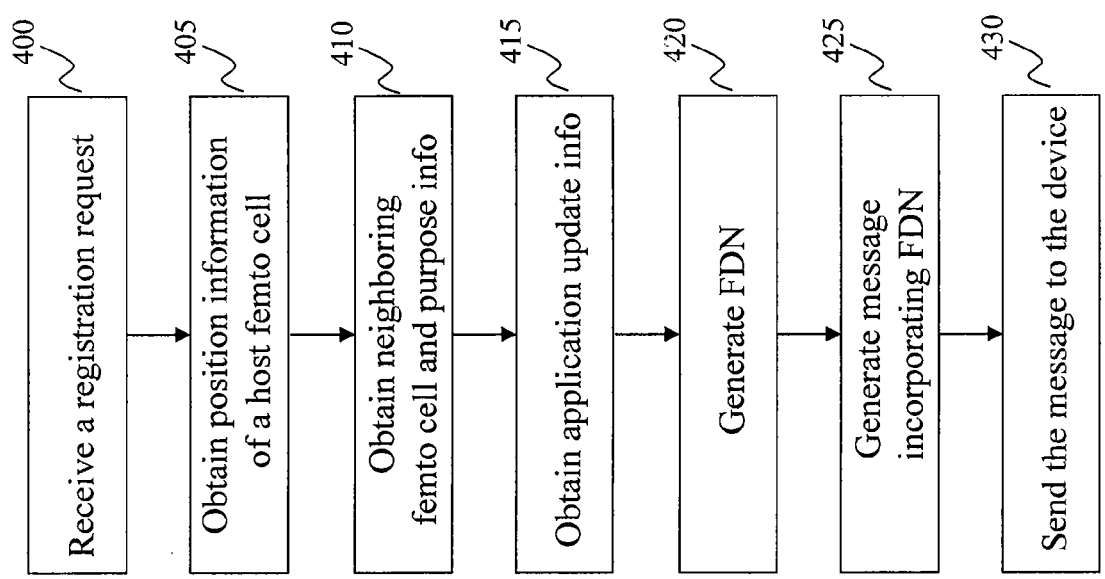
FIGS. 4(a)-4(c) are flowcharts of exemplary processes for a femto servicing switch system.
Figure 4B:
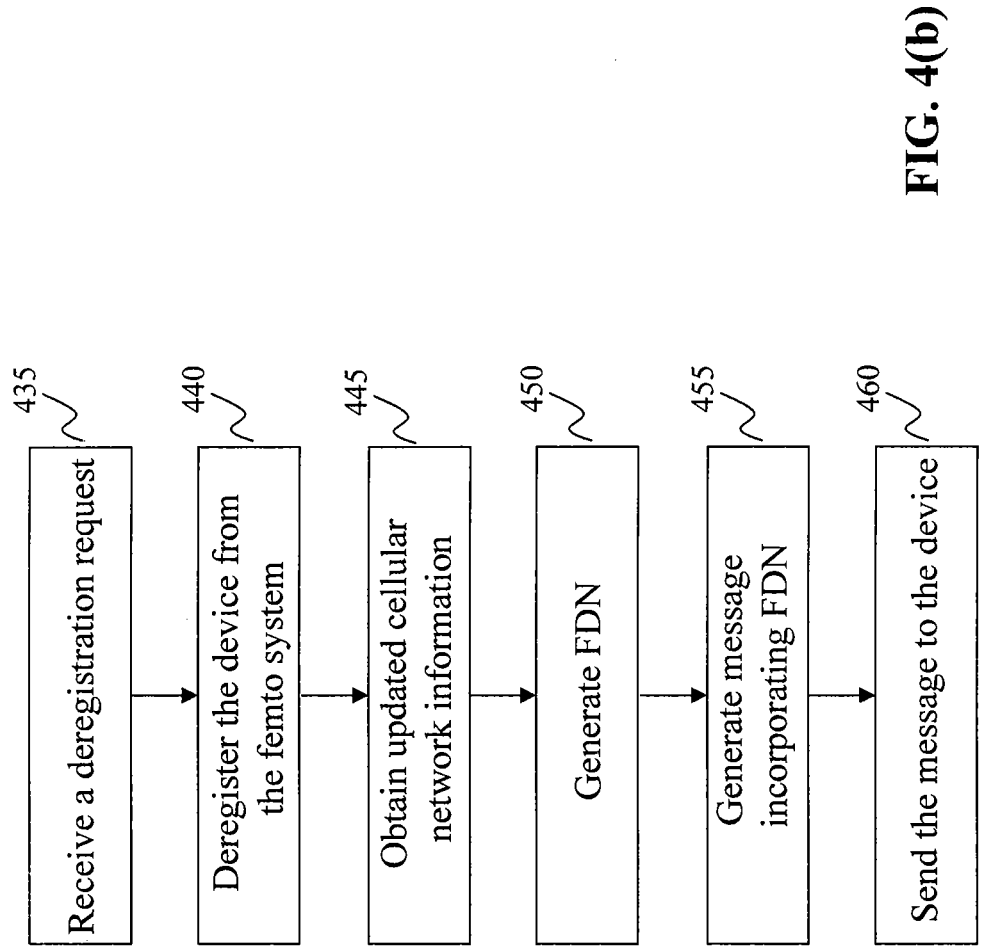
Figure 4C:
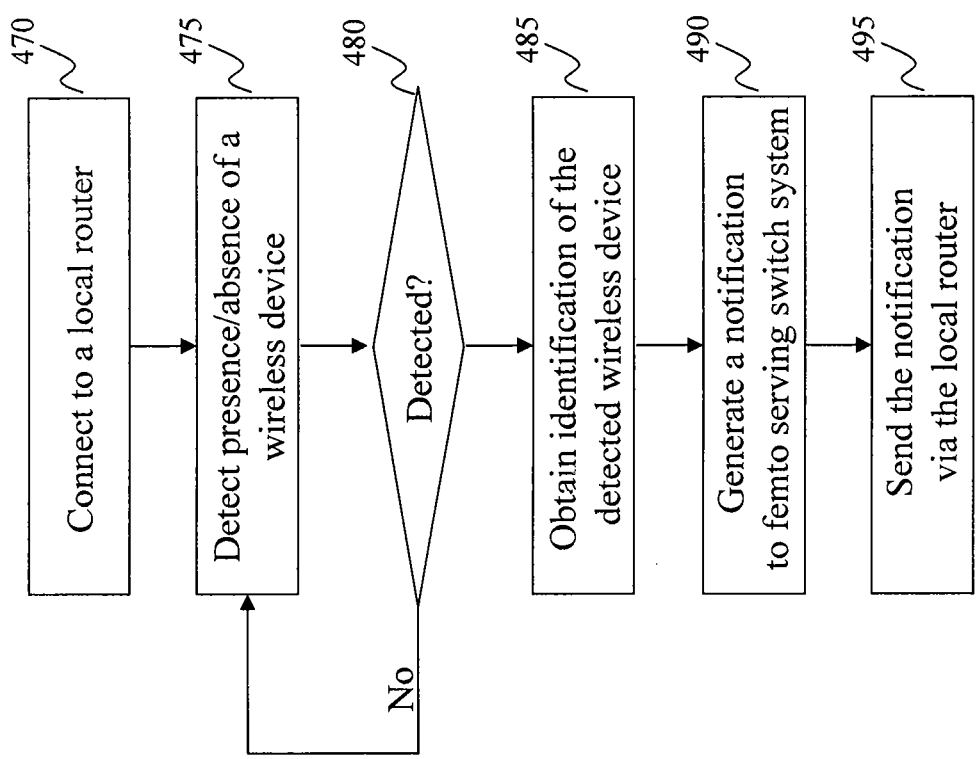

FIGS. 4(*a*)-4(*b*) are flowcharts of exemplary processes for the femto servicing switch system 210. FIG. 4(*a*) shows an exemplary process in which the femto serving switch system switches a wireless device from a cellular service network to a femto cell environment. A request for registering a wireless device with a femto cell environment is received at 400. Such a request may be a combination of a notification of the detection of the wireless device from a presence sensing femto cell. The request may also include the identifier of the presence sensing femto cell. Upon receiving the request, the femto serving switch system identifies the presence sensing femto cell (e.g., via an identifier sent along with the request) and accordingly identifies one or more femto cells configured in the femto cell environment in which the presence sensing femto cell is located (now shown). Based on such information, the femto serving switch system identifies a host femto cell in the femto cell environment and obtains, at 405, its position information. Then, the neighboring femto cells in the same femto cell environment are identified, at 410. As discussed herein, such neighboring femto cells may be identified based on both stored information regarding distribution of the femto cells in the network as well as any health information related to those femto cells. Information associated with such identified femto cells may include identifier, version, security certificate, and position of each of the femto cells. In addition, applications supported by each of the femto cells in the femto environment and information related thereto (version, upgrades, operational parameters, etc.) are also obtained at 415. Based on such information, an FDN is generated at 420. The femto serving switch system then generates, at 425, a carrier message, which is to be used to deliver the FDN to the detected wireless device, based on the information so far obtained. Such generated message is then sent, at 430, from the femto serving switch system.

FIG. 4(*b*) shows an exemplary process in which the femto serving switch system switches a wireless device from a femto cell environment to a cellular service network. At 435, a request for deregistering a wireless device is received. Such a request may be from a presence sensing femto cell that detects that the wireless device is about to leave the femto cell environment. The deregistration could also be derived implicitly from receipt of a registration related message from the cellular system indicating that the device is now registered to the cellular network. The request may also be from the wireless device itself when the device senses that it is about to leave the femto cell environment. This is possible if the wireless device is provided with the information about all femto cells in the femto cell environment in which it is registered. Such information includes the identifiers and the positions of the femto cells so that it is possible that the wireless device is able to detect that it is about to leave the femto cell environment, e.g., when it can no longer detect any of the femto cells based on their identifiers.

Upon receiving the request from a wireless device leaving a femto cell environment, the femto serving switch system deregisters, at 440, the wireless device. Such deregistration may be carried out in a series of steps (now shown) such as obtaining the identifier and positional information of the wireless device and record in a log that the wireless device left a particular femto cell environment at a particular date and time. To facilitate the wireless device to re-enter a cellular service network (first network 120), the femto serving switch system may also obtain, at 445, updated information about the cellular service network. To convey such information to the wireless device, the femto serving switch system generates, at 450, an FDN and an appropriate carrier message, at 455. Such information, once sent, at 460, to the wireless device, may help the wireless device to leave the femto cell environment and enter the cellular service network properly and smoothly.

FIG. 4(*c*) shows an exemplary process in which a presence sensing femto operates in a femto cell environment to detect the presence or absence of a wireless device. The presence sensing femto cell is connected, at 470, a local router, e.g., router 170, through which the presence sensing femto cell is able to communicate with the femto serving switch system 210. In operation, the presence sensing femto cell detects, at 475, either the presence or absence of a wireless device. In some implementations, a single femto cell may be configured to be able to detect both presence and absence of a wireless device. In this case, when a wireless device newly enters the femto cell environment in which the presence sensing femto cell is deployed, the presence sensing femto cell detects the presence of the newly arriving wireless device. After the wireless device enters and operates in the femto cell environment, the presence sensing femto cell may then switch to detect the absence of the wireless device.

In some implementations, more than one femto cell may be configured to detect wireless devices. In some embodiments, each of such femto cells may be capable of detecting both the presence and absence of a wireless device. In some embodiments, each sensing femto cell may be designated to detect either the presence or the absence (but not both) of wireless devices. In this implementation, different sensing femto cells may hand off tasks. For example, once the presence of a wireless device is detected and the wireless device is subsequently registered with the femto cell environment, the identity of the wireless device may be transmitted to another femto cell whose responsibility is to detect the absence or departure of the wireless device and assist with the deregistration of the wireless device once its absence is detected.

When either the presence or absence of a wireless device is detected, determined at 480, the sensing femto cell obtains, at 485, the identifier of the wireless device and/or other relevant information and constructs, at 490, a notification message and sends, at 495, the notification to the femto serving switch system 210. In this manner, the sensing femto cell(s) and the femto serving switch system 210 work cooperatively to assist a wireless device to switch seamlessly between a cellular service network and a femto cell environment. With this configuration, as a wireless device is now passively (rather than actively) switched between different environments in a network-assisted manner, the wireless device itself does not need to be configured with the identifiers of all femto cells and can operate in a more light weight manner. Because of that, the overall system is more scalable. Due to the fact that in a network generated FDN, dynamic information can be included and conveyed to a wireless device as to the applications or services offered in each locale, the use experience can also be enhanced because each wireless devices can now be more adaptive, based on information provided in an FDN, in terms of services offered at each locale. Furthermore, an upgrade to any femto supported application can be dynamically delivered to a wireless device via an FDN each time when such upgrade is released.

With such a configuration as shown in FIG. 2, as information of all neighboring femto cells in a femto cell environment is delivered to a wireless device via an FDN, it enables the wireless device to perform device-based femto discovery within each femto cell environment it enters without having to configure the wireless device with information of femto cells from different femto cell environments. In addition, whenever the configuration of each femto cell environment changes, a wireless device does not need to be re-configured to reflect the changes. With configuration, it is also possible that an application within a wireless device may be able to relay information received via an FDN to other applications, either existing today or developed in the future. The seamless switching of a wireless device between a cellular service network and a femto cell environment may also be applied to an inter-operator scenario as device registrations involve authentication with the device's home network. The home network can detect a serving system dedicated to serving only devices camped on a femto cell environment and can use this information to send home-operator specific messaging.

Figure 5:
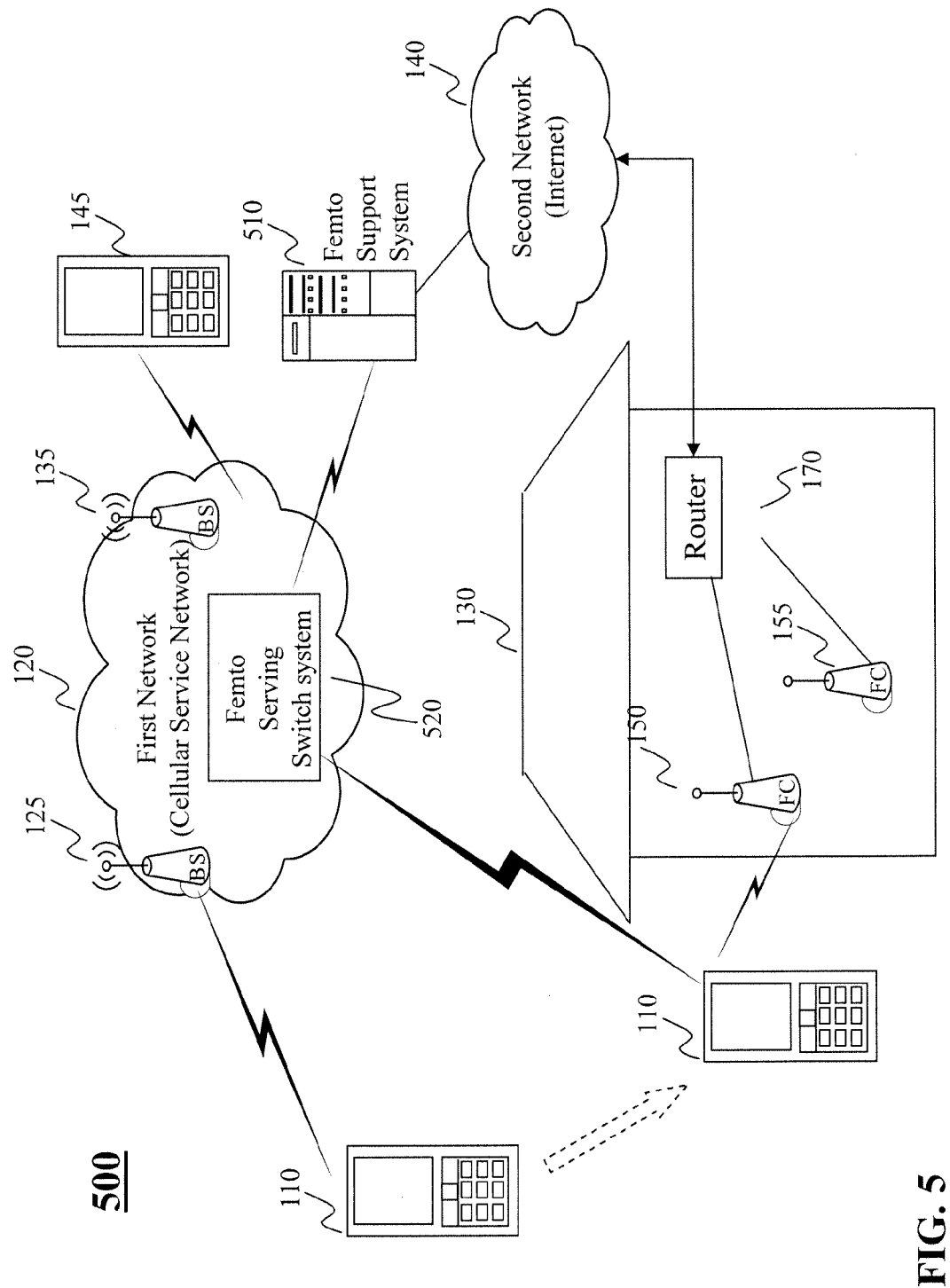
FIG. 5 shows a different network configuration in which wireless devices interface directly with a femto serving switch system when it is switched from/to a cellular service network to/from a femto cell environment.

In a different implementation as shown in FIG. 5, an FDN is generated by a femto support system and then sent to the femto serving switch system 210 from where it is then sent to a wireless device. FIG. 5 shows such a network configuration 500, in which all other components are similarly configured except that a femto support system 510 is deployed and it is connected to both the router 170, via a second network 140, and one or more femto serving switch systems (one is shown as 520). In this configuration, when a wireless device 110 enters a femto cell environment, a sensing femto cell, e.g., 150, senses the presence of the newly arriving wireless device and notifies the femto support system 510, via the router and the second network, of the detected presence of a wireless device. Upon receiving such a notification, the femto support system 510 registers the wireless device with a specific femto system appropriate for the location where the wireless device is detected and identifies a femto serving switch system appropriate to handle the hand-off of the detected wireless device. The femto support system 510 then generates an FDN based on information relevant to the identified femto serving switch system. Such generated FDN is then sent to the femto serving switch system 520.

Upon receiving an FDN together with an identifier for the wireless device, the femto serving switch system 520 may analyze and/or modify the FDN before it sends the FDN to the wireless device. As discussed herein, once the wireless device receives the FDN, it will perform a series of operations to adapt itself to a femto cell environment 130. On the other hand, when the wireless device is leaving the femto cell environment, in some implementations, the wireless device may itself detect it based on, e.g., a list of neighboring femto cell information provided by the FDN when it enters the femto cell environment. In some implementations, a sensing femto cell may sense that the wireless device is leaving a particular femto cell environment. In either case, the fact that the wireless device is leaving a specific femto cell environment is reported to the femto support system 510, via router 170 and the second network 140, which then deregisters the wireless device and generates an FDN for the purpose of switching the wireless device back to a cellular service network. This FDN is then sent to the femto serving switch system 520, where appropriate modifications may be made to the FDN, which is subsequently sent to the wireless device to complete the switching.

Figure 6A:
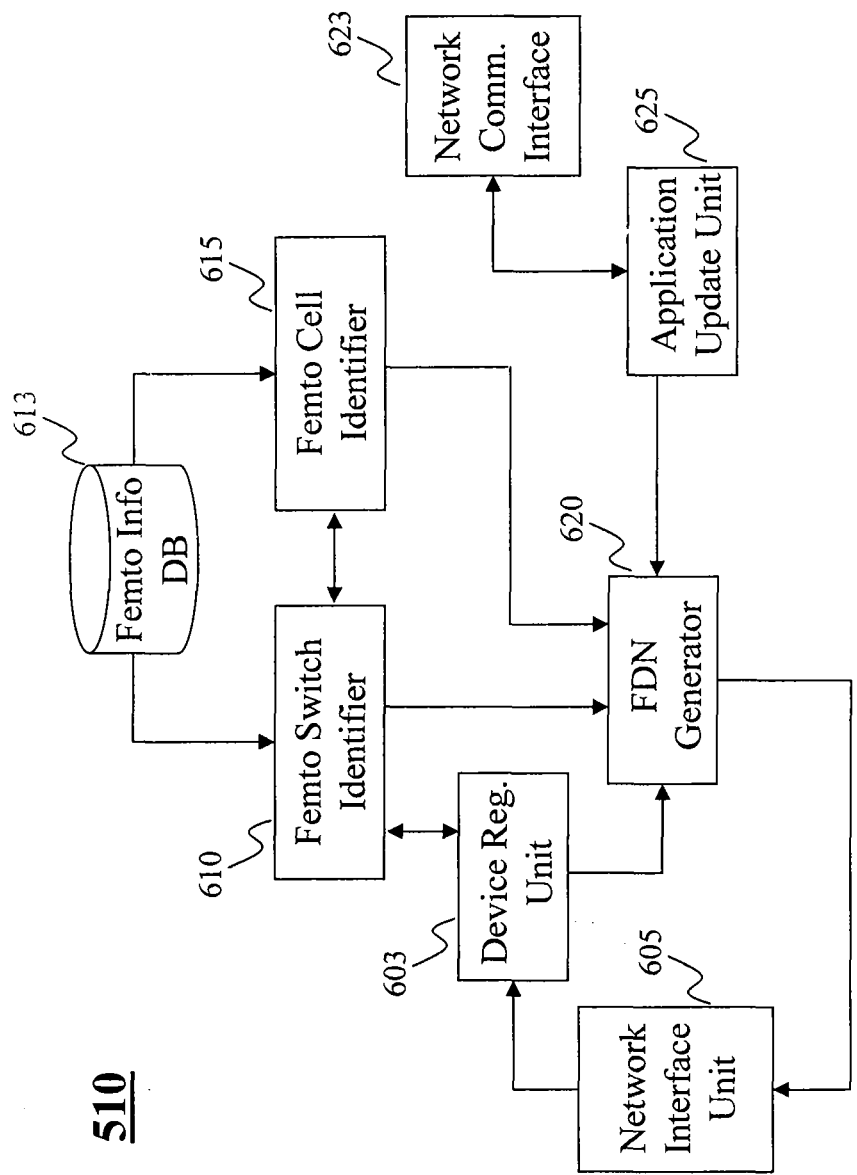
FIG. 6(a) depicts an exemplary system diagram of a femto support system.
Figure 6B:
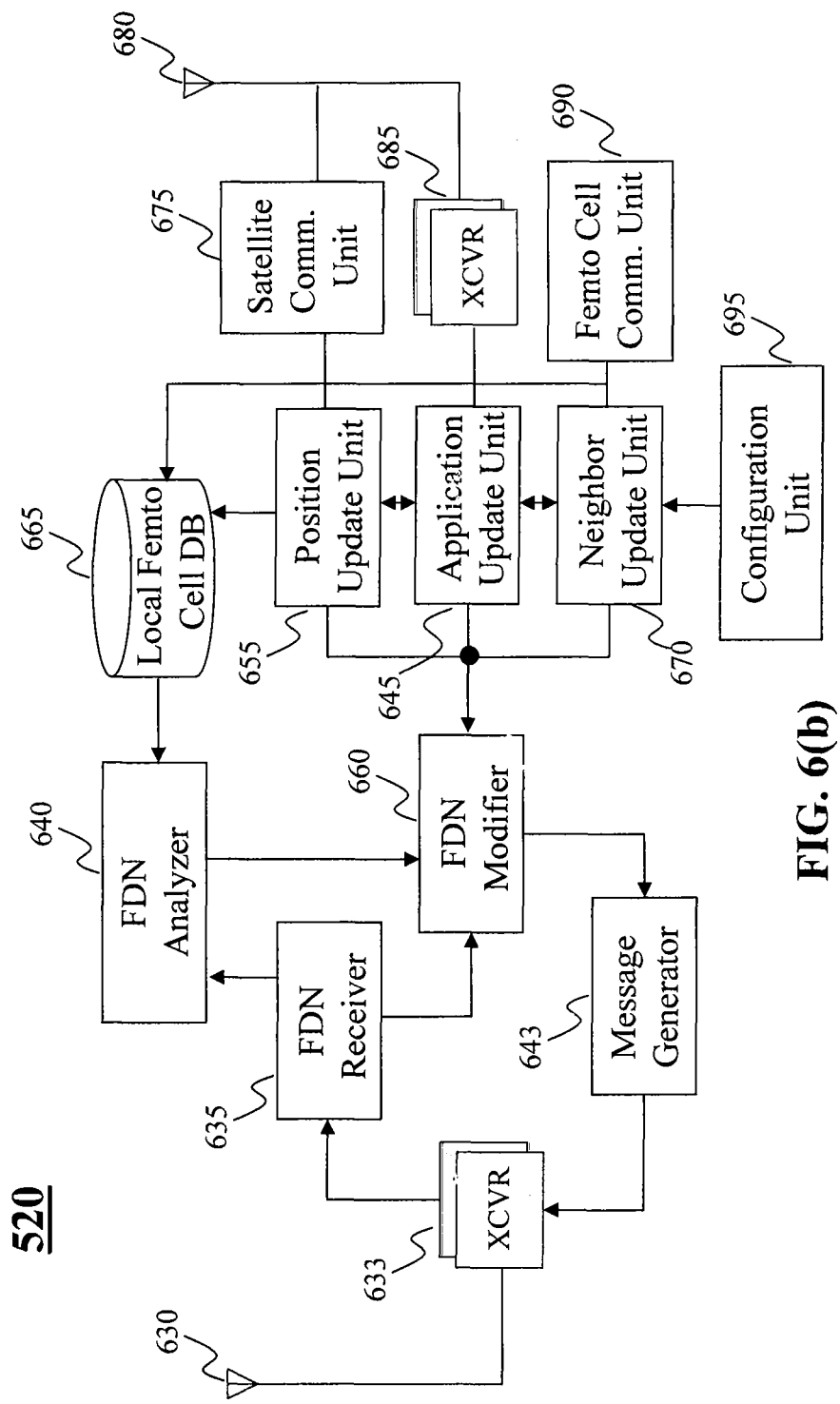
FIG. 6(b) depicts an exemplary system diagram of a femto serving switch system.

FIG. 6(*a*) depicts an exemplary system diagram of the femto support system 510. In this exemplary implementation, the femto support system 510 includes a network interface unit 605, a device registration/deregistration unit 603, a femto switch identifier 610, a femto cell identifier 615 and an FDN generator 620. The network interface unit 605 interfaces, via the second network 140, with the router 170 (to which the sensing femto cell is connected) to receive notifications of a detected presence of a wireless device. The network interface 605 also interfaces with the first network, through which an FDN, generated by the femto support system, is to be sent to a femto serving switch system 520.

The device registration/deregistration unit 603 is responsible for registering and deregistering wireless devices with a certain femto cell environment. The registration or deregistration may be performed with respect to a specific femto cell environment that the detected wireless device is approaching. As discussed herein, since in some implementations, there may be multiple femto serving switch systems distributed in the first network, the femto support system 510 may also need to identify an appropriate femto serving switch system in the first network which is responsible for the femto cell environment 520 (that the detected wireless device is approaching). In system configuration 500, the femto switch identifier 610 may be responsible for identifying a particular femto serving switch system given the detected wireless device information (received from the sensing femto cell), e.g., its geographical position. The identification may be done with respect to a femto information database 613, which may store all the femto serving switch systems distributed in the entire first network 120.

Based on the particular femto serving switch system, identified by the femto switch identifier 610, the femto cell identifier 615 may also be invoked to identify, based on information stored in the femto cell information database 613, a specific host femto cell within a femto cell environment managed by the identified femto serving switch system 210. With such identified specific femto serving switch system 520 and host femto cell, the device registration/deregistration unit 603 registers/deregisters the wireless device as needed. The registration information is then forwarded to the FDN generator 620 and used to generate an FDN to be sent to the wireless device. In addition, the identified specific femto serving switch system 520 as well as the host femto cell located in the femto cell environment may also be sent to the FDN generator 620 and used to generate an appropriate FDN. Furthermore, the femto support system 510 may also identify application update information, via an application update unit 625, so that information about applications supported by the host femto cell can be integrated in the FDN generated. The application update unit 625 may gather dynamic relevant information via a network communication interface 623.

When the FDN is generated, it is forwarded to the network interface unit 605, which then transmits the FDN to the femto serving switch system identified. In some implementations, the femto support system may also identify neighboring femto cells and information associated with such neighboring femto cells (not shown). Examples of information related to neighboring femto cells includes position, identifier, application supported, etc. Such information may also be included by the femto serving switch system 520 once it receives the FDN by modifying the FDN before sending it to the wireless device. In some implementations, this may be more appropriate because the femto serving switch system 520 identified as responsible for the geographical region where the wireless device is detected may have more accurate and localized information than the femto support system 510, which may not be local.

FIG. 6(*b*) depicts an exemplary system diagram of the femto serving switch system 520, which may be identified by the femto switch identifier 610 in FIG. 5. Although components in the femto serving switch system 520 related to the present teaching may be similarly constructed in different femto serving switch systems distributed in the first network 120, the overall constructs among different femto serving switch systems may or may not be identical or similar. The exemplary construct of the femto serving switch system 520 includes an FDN receiver 635, an FDN analyzer 640, and an FDN modifier 660 which will modify a received FDN if needed. Other components, including the message generator 643, position update unit 655, application update unit 645, neighbor update unit 670, configuration unit 695, femto cell communication unit 690, and satellite communication unit 675 are similar to the similar components as discussed herein with respect to FIG. 2.

When the femto support system 510 sends an FDN to the femto serving switch system 520, it is received by the FDN receiver 635 via, e.g., a transceiver 633 and an antenna 630. The received FDN is then analyzed by the FDN analyzer 640 and the analysis result may determine whether and/or how the FDN is to be modified. For example, the FDN analyzer may examine information related to the host femto cell in the FDN and check with a local femto database 665 to see whether, e.g., the health condition of the specified host femto cell permits it to serve as a host femto cell. If not, modification may be made to the FDN as to the host femto cell. In addition, the received FDN may not include information associated with the neighboring femto cells (e.g., the femto support system 510 may not have updated information regarding neighboring femto cells of all host femto cells). In this case, modification may need to be made to include such information in the FDN before it is sent to the wireless device. Furthermore, while the femto support system 510 may have general information as to a set of generic applications supported by all femto cells, it may not have specific information as to what localized applications are supported in each specific femto cell environment (e.g., such information may be stored in the femto serving switch system responsible for the specific femto cell environment). In this case, each femto serving switch system, once it receives an FDN from the femto support system, may need to supplement information about any application that is supported in each specific femto cell environment.

To modify an FDN, the FDN modifier 660 takes the received FDN and the analysis result from the FDN analyzer 640 as inputs and controls the modification of the FDN. For instance, based on the analysis result from the FDN analyzer 640, the FDN modifier 660 may invoke different components to gather information that needs to be supplemented in the FDN. For instance, the FDN modifier 660 may request neighboring femto cell information from the neighbor update unit 670. It may also request the application update unit 645 to provide most updated information as to the applications supported in the specific femto cell environment near where the wireless device is detected. Such gathered information is then used by the FDN modifier 660 to generate a modified FDN. Such generated modified FDN is then forwarded to the message generator 643 where a message of an appropriate type is generated by incorporating the modified FDN therein and sent to the wireless device via transceiver 633 connected to the Internet.

FIG. 7(a) is a flowchart of an exemplary process in which the femto support system 510 operates to switch a wireless device from a cellular service network to a femto cell environment. A notification of the presence of a wireless device, entering a femto cell environment, detected by a sensing femto cell is first received at 705. Based on the notification, a femto serving switch system and a host femto cell associated with the femto cell environment are identified at 710 and 715, respectively. The position information of the host femto cell is then obtained at 720. Information associated with application(s) offered at the femto cell environment the wireless device is entering, is then identified at 725. An FDN is generated at 730 based on the gathered information and sent to a femto serving switch system at 735.

Figure 7B:
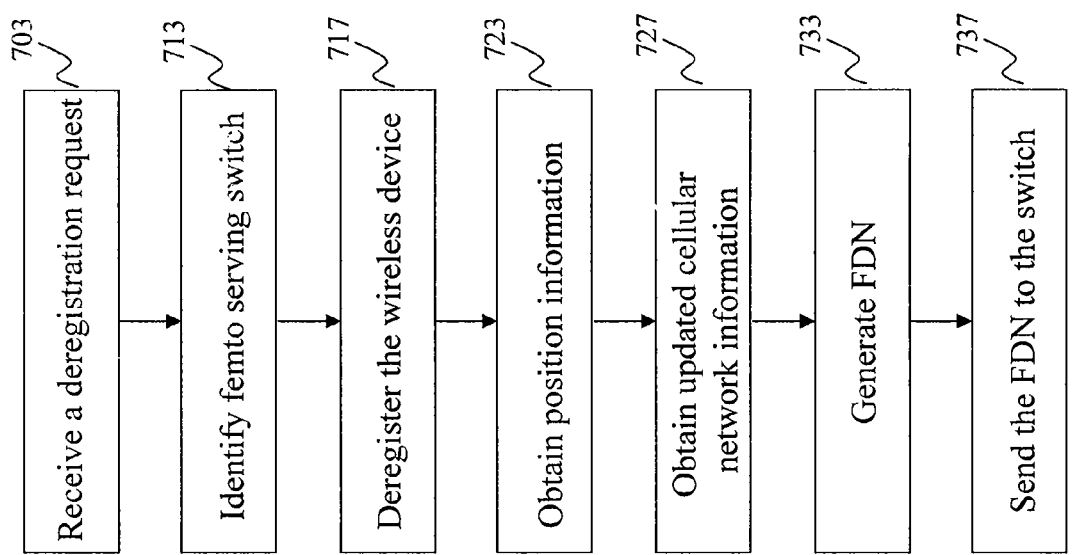

FIG. 7(b) is a flowchart of an exemplary process in which the femto support system 510 operates to switch a wireless device from a femto cell environment to a cellular service network. A request for deregister a wireless device is first received at 703. The request may be from a sensing femto cell that senses that a wireless device is leaving a femto cell environment. The request for deregistering a femto cell environment may also be from a wireless device that is departing a femto cell environment, as discussed herein. An appropriate femto serving switch system corresponding to the femto cell environment may be identified at 713. The femto support system then deregisters the wireless device from the femto cell environment at 717. The geographical position of the departing wireless device may then also be obtained at 723. To assist the wireless device to switch to a cellular service network, updated information regarding the cellular service system is obtained at 727. Other information useful to assist the wireless device to make the switch may also be obtained (not shown). Such gathered information is then used to generated an FDN at 733, which is then sent to the identified femto serving switch system at 737.

Figure 7C:
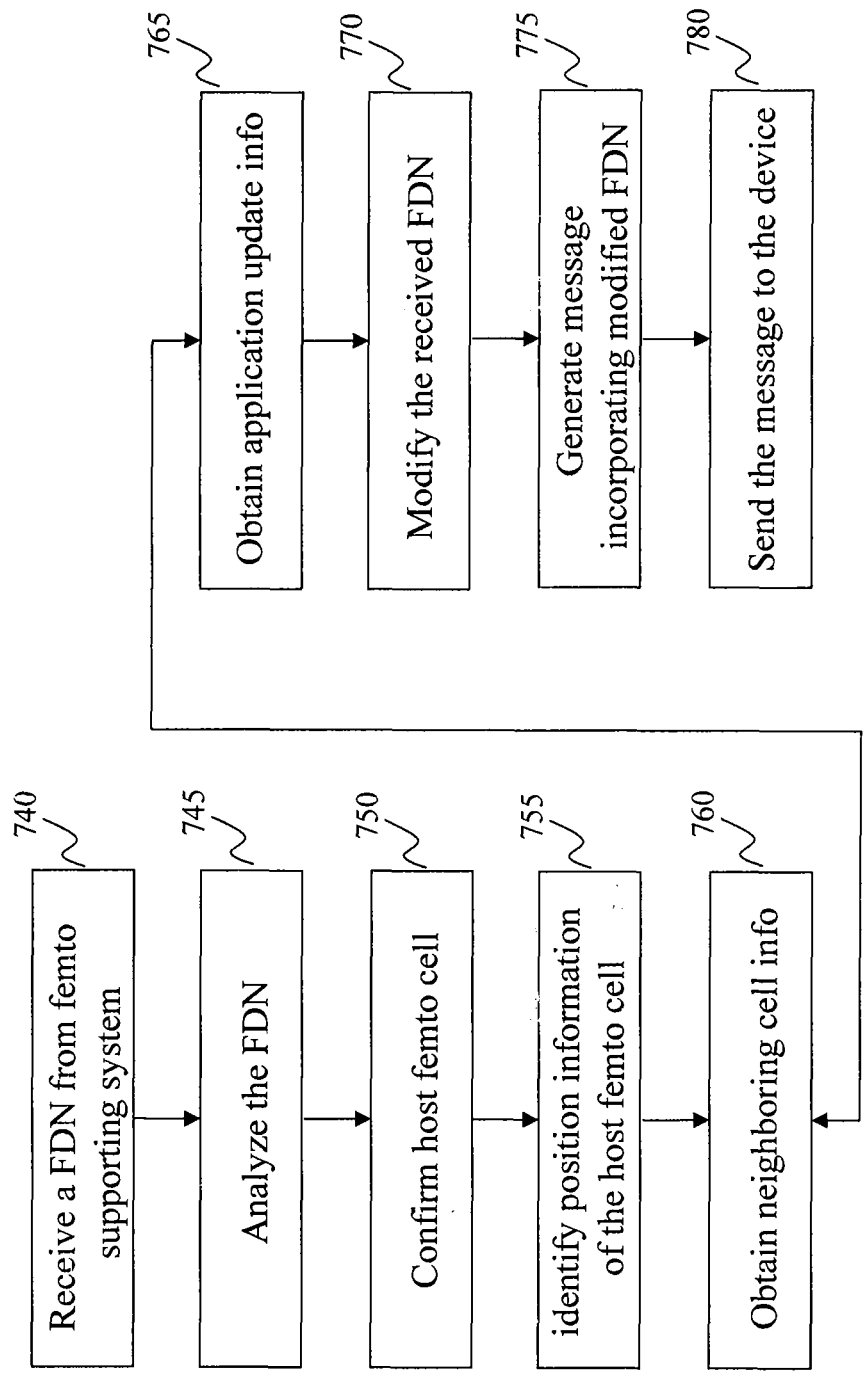
FIG. 7(c) is a flowchart of an exemplary process in which a femto serving switch system operates to assist in switching a wireless device between multiple adjoining femto cell environment.

FIG. 7(c) is a flowchart of an exemplary process in which the femto serving switch system 520 operates to assist in switching a wireless device between a cellular service network and a femto cell environment. An FDN is first received at 740 and then analyzed at 745. The host femto cell identified in the received FDN is confirmed at 750. If not suitable, a new host femto cell is identified (not shown). Then the position information of the host femto cell is obtained at 755 and neighboring femto cells and their corresponding information is obtained at 760. In addition, application(s) offered by the host and neighboring femto cells are obtained at 765. Based on such collected information, the received FDN is modified at 770. To transmit the FDN to the wireless device, a message appropriate to the local setting is generated, at 775, to incorporate the modified FDN. The message is then sent to the wireless device at 780.

Figure 8A:
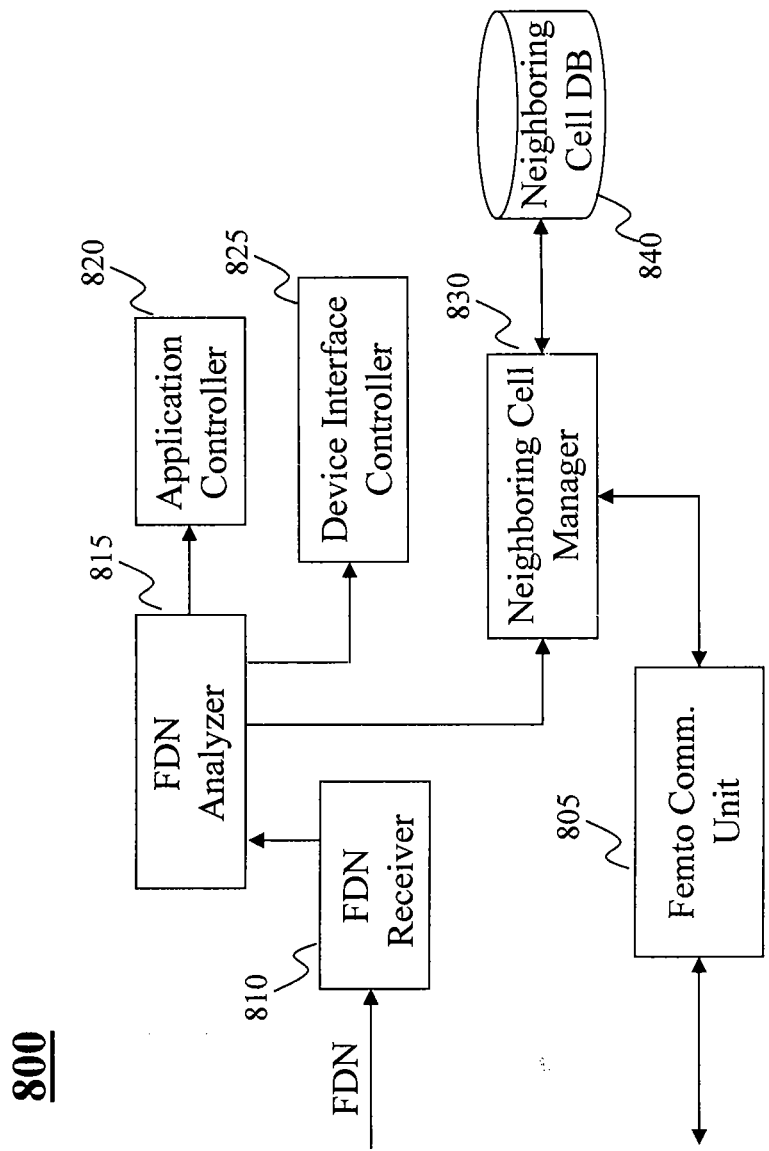
FIG. 8(a) depicts an exemplary system diagram of an FDN processing application deployed on a wireless device to assist operation of the wireless device between a cellular service network and a femto cell environment.

FIG. 8(a) depicts an exemplary system diagram of an FDN processing application 800 residing in and running on a wireless device to handle network-assisted switching of the wireless device between a cellular service network and a femto cell environment. The FDN processing application 800 includes an FDN receiver 810, an FDN analyzer 815, a neighboring cell manager 830, an application controller 820, a device interface controller 825, and a femto communication unit 805. The FDN receiver 810 is responsible for receiving an FDN sent from the femto support system 510. Upon receiving the FDN, the FDN receiver forwards the FDN to the FDN analyzer 815. Information contained in the FDN is extracted and analyzed by the FDN analyzer 815. Examples of information include neighboring femto cells in the femto cell environment, applications offered within the femto cell environment, etc. Neighboring femto cell information is forwarded to the neighboring cell manager 830, which stores the neighboring cell information in a data storage neighboring cell database 840. Such neighboring cell information is used by the neighboring cell manager 830 to, e.g., conduct communications between different femto cells, etc.

The neighboring femto cell information stored in the neighboring cell database 840 may also be used by the femto communication unit 805 to determine whether the wireless device is still in contact with any of the femto cells in the neighborhood. This may enable the wireless device to detect, on its own, whether it is leaving a femto cell environment. If the FDN processing application 800 can not find any of the femto cells specified in the neighboring cell database 840, it may indicate that it is leaving the underlying femto cell environment. If so, the femto communication unit 805 may send a request to deregister itself from the femto cell environment. As discussed herein, such a request, once received and processed, may cause the wireless device to receive another FDN from the network, designated to assist the wireless device to enter the cellular service network.

The application information identified from the received FDN may also be used by the application controller 820 so that it can accordingly determine which application(s) should be awakened. Similarly, the device interface controller 825 may also use such information to control how to update the device interface. For instance, if a game application is offered by the host femto cell in the femto cell environment but not in a cellular service network, once entering into the femto cell environment, the application controller 820 may wake up that application and the device interface controller 825 may modify the device interface by placing a new icon representing the game application on the device display interface. As another example, if a femto cell environment offers an application for some social group, the application controller may also wake up that application and the device interface controller 825 may then allocate a small piece of real estate on the device display for a chat room of the social group, which may be dynamically displayed real time. Through this chat room, the user of the wireless device (who may be a member of the social group) may then become active online with other members of the social group. Another different example is some commercial offer or advertisements available only locally in the vicinity of the femto cell environment. In this case, applications related to the offers or advertisements are made active on the device by the application controller 820 and the content of the offers/advertisements are displayed on the device interface. The operations of such applications made it possible for the user of the device to interact with the application to, e.g., take upon some offer or explore some advertisement or even make purchases through the application and the network connections.

Figure 8B:
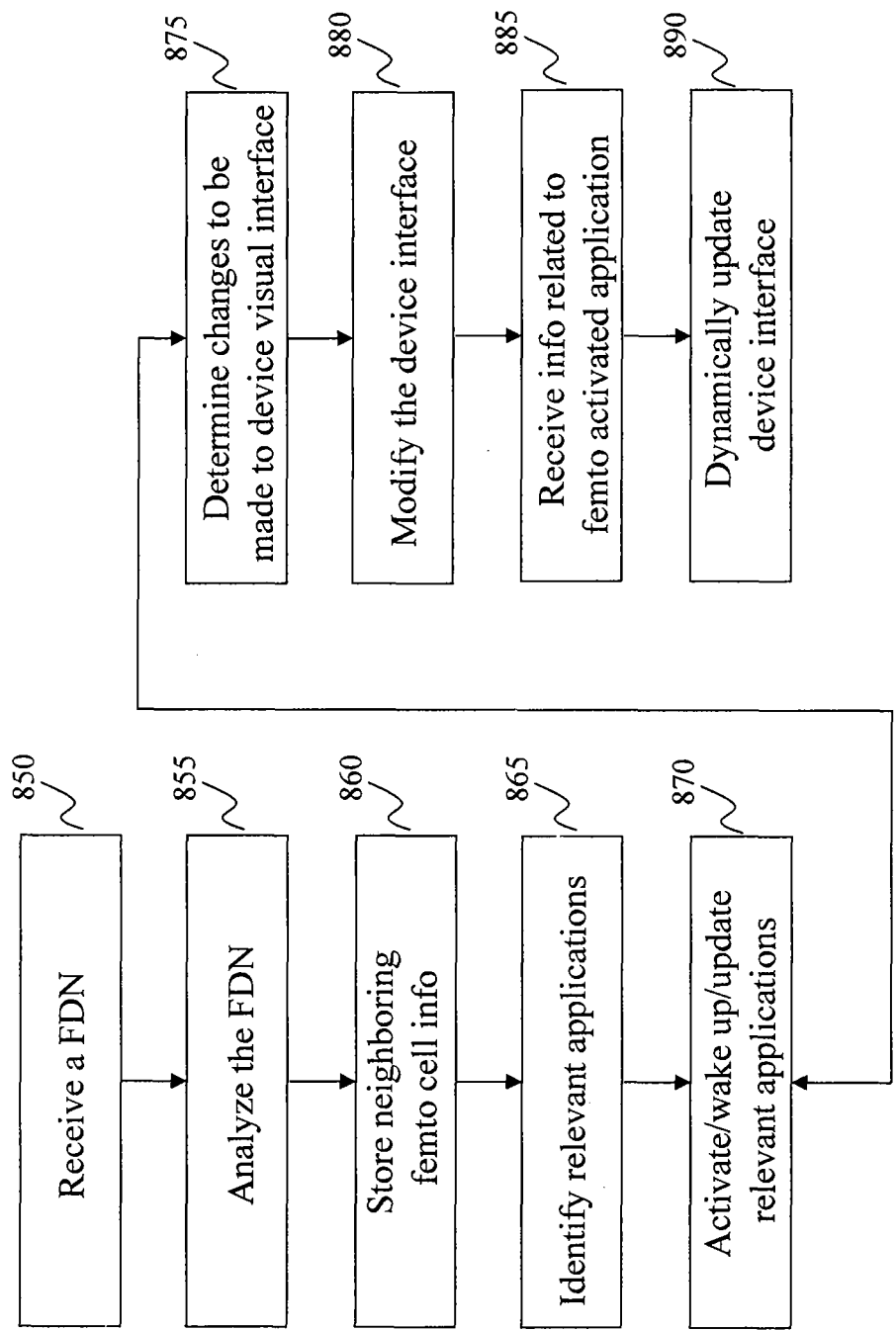
FIG. 8(b) is a flowchart of an exemplary process in which an application deployed on a wireless device operates to carry out functions when entering into a femto cell environment.

FIG. 8(b) is a flowchart of an exemplary process in which the FDN processing application deployed on a wireless device operates to carry out functions when entering into a femto cell environment. An FDN is first received, at 850, by the FDN processing application and analyzed at 855. Information related to neighboring femto cells are identified from the FDN and stored, at 860, in the neighboring cell database. Information relevant to applications offered/supported in the femto cell environment is also obtained from the FDN at 865. Based on such information, such applications are awakened or activated at 870. A determination as to changes to be made to the device interface is made at 875 based on information contained in the FDN and modification(s) needed on the device interface are then made at 880. Once femto supported applications are activated, when dynamic information related to such application(s) is received (e.g., a user interaction with a femto supported application) at 885, the device interface is accordingly updated at 890.

The femto serving switch system (210 or 520) and sub-components contained therein, e.g., the FDN generator 315, the device registration/deregistration unit 305, the femto support system 510 and its sub-components, as well as the FDN processing application deployed in a wireless device may be realized based on hardware implementations. In some embodiments, they may be realized by software or firmware programmed to achieve the functionality of routing traffic across different network interfaces, as disclosed herein. They may also be realized based on a combination of hardware and software or firmware.

Figure 9:
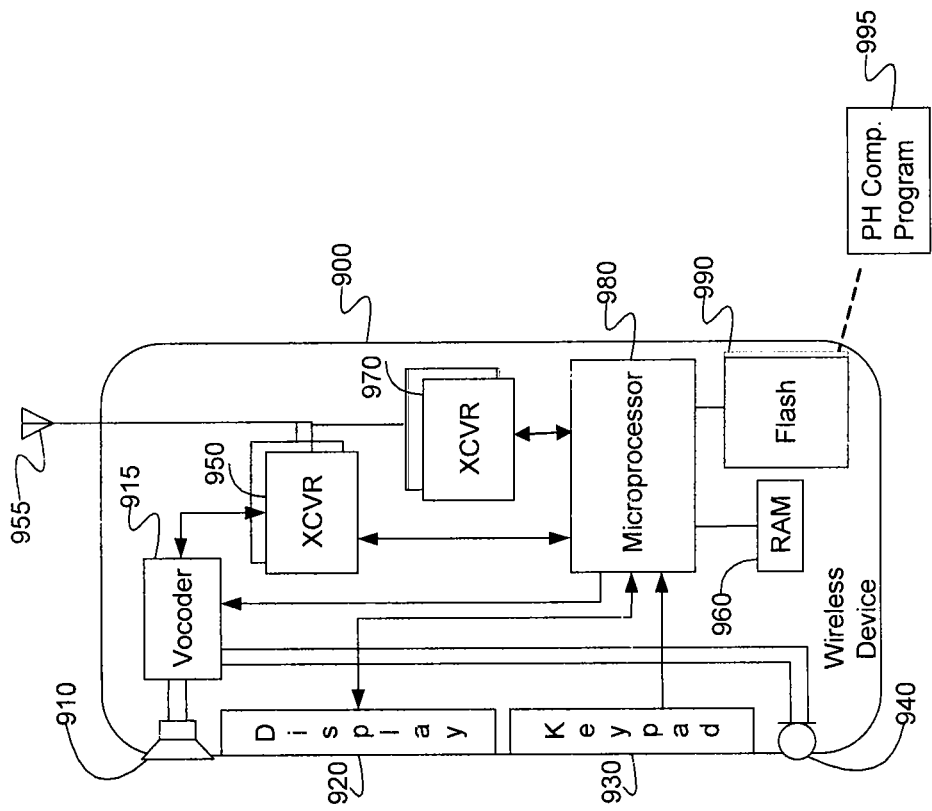
FIG. 9 is a high level functional block diagram of a wireless device, which may be configured to operate in both a cellular service network and a femto cell environment.

FIG. 9 is a high level functional block diagram of a wireless device 900, which may correspond to the wireless device 110 or 145 of a customer of a network operator and configured to operate in both a cellular service network and a femto cell environments. Although the wireless mobile device 900 may be a smart-phone or may be incorporated into another device, such as a portable personal computer, personal digital assistant (PDA) or the like, for discussion purposes, the illustrations in FIGS. 2 and 5 show the wireless device (110 or 145) in the form of a handheld device. The handheld device embodiment of the wireless mobile device 900 may function as a normal digital wireless telephone station. For that function, the mobile device 900 includes a microphone 940 for audio signal input and a speaker 910 for audio signal output. The microphone 940 and speaker 910 connect to voice coding and decoding circuitry (vocoder) 915. For a voice telephone call, for example, the vocoder 915 provides two-way conversion between analog audio signals representing speech or other audio and digital samples at a compressed bit rate compatible with the digital protocol of wireless telephone network communications or voice over packet (Internet. Protocol) communications.

For digital wireless communications, the mobile device 900 also includes at least one digital transceiver (XCVR) 950. The mobile device 900 is a multimode device capable of operations on various technology type networks, such as the networks 120 and 140. For example, the mobile device 900 may utilize one or more of 3GPP2 (1XRTT and EVDO) technologies, 3GPP (LTE/GSM/UMTS) technologies, or IEEE 802.11 (WiFi, WiMax, etc.) technologies. For that purpose, the transceiver (XCVR) 950 could be a multimode transceiver, or the mobile device 900 may include two or more transceivers, e.g., transceivers 950 and 970, each of which supports a subset of the various technologies or modes. The concepts discussed herein encompass embodiments of the mobile device 900 utilizing any digital transceivers that conform to current or future developed digital wireless communication standards.

Figure 1:
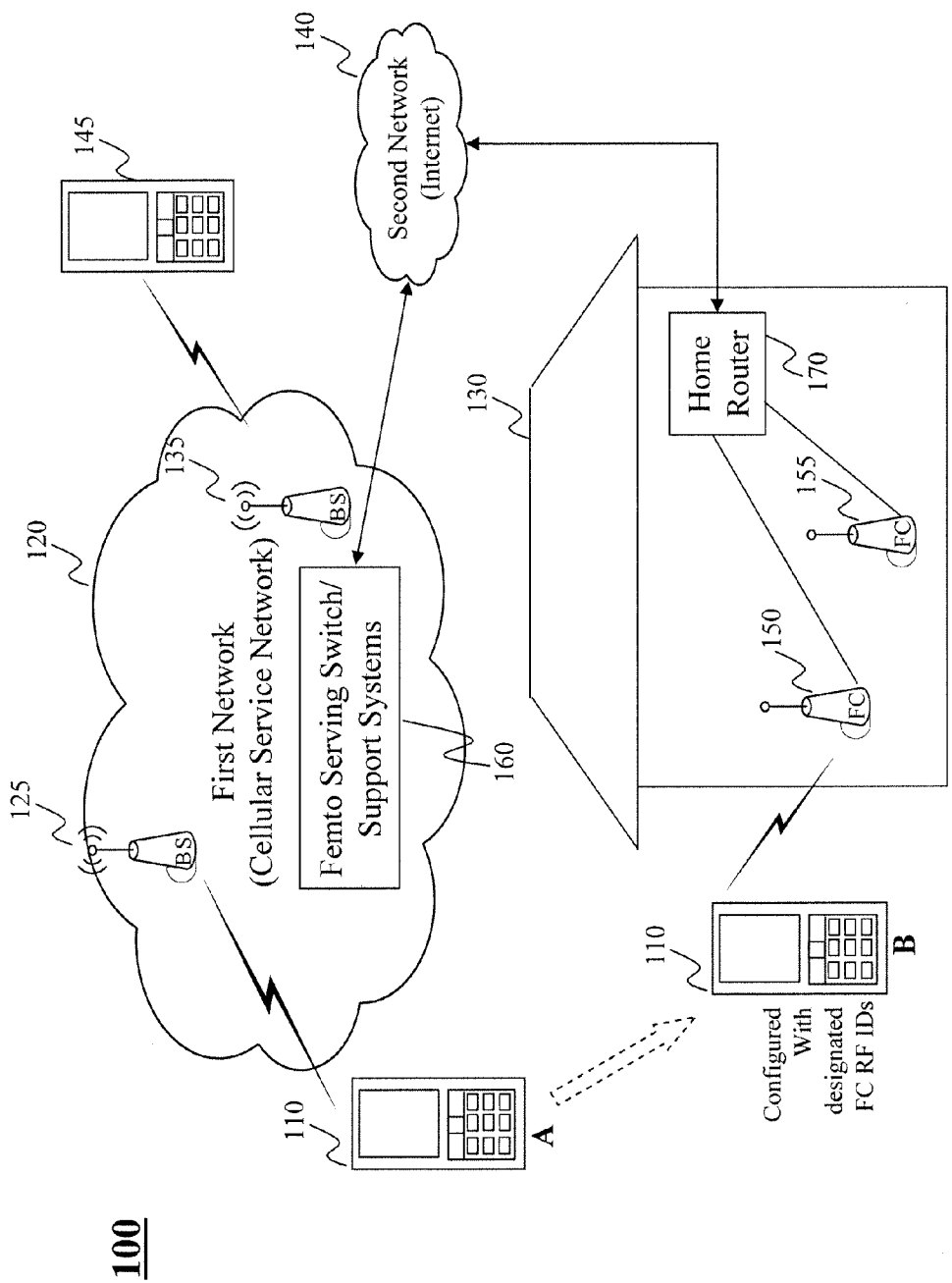
FIG. 1 (Prior Art) shows a network configuration in which wireless devices interact with each other via either a cellular service network or femto cells for enhanced services.

The transceiver 950 or 970 provides two-way wireless communication of information, such as vocoded speech samples and/or digital message information, in a selected one of the technology modes. The transceiver 950 or 970 also sends and receives a variety of signaling messages in support of the various voice and data services provided via the mobile device 900 and the communication network (described earlier with regard to FIG. 1). Each transceiver 950 or 970 connects through RF send and receive amplifiers (not separately shown) to a set of antennae 955. In the example, the transceiver 950 or 970 is configured for RF communication in accord with a digital wireless protocol, such as the current 3GPP2 and 3GPP protocols. Transceiver 950 or 970 is capable of detecting different network types in any given service area via, e.g., antenna 955. In some embodiments, a mobile device implements the algorithms for switching between different network environments or separate neighboring base stations of the same network environment, as described herein, locally on the device based on the network-assisted femto discovery. In this case, the capabilities of switching between different network environments or separate neighboring base stations of the same network environment may be turned on whenever the mobile device is activated and does not need to download programs that perform the algorithms for performing network-assisted discovery and switching between a cellular service network and a femto cell environment. In some embodiments, a mobile device may be designed to dynamically download programs for switching between a cellular service network and a femto cell environment from a centralized location, e.g., a server, via the network. In this situation, the network communications may also support downloading of programs designed to perform the algorithm for switching between different network environments as described herein and data and/or updates thereof from a server.

The mobile device 900 includes a display 920 for displaying messages, menus of different applications or the like, call related information requested by the user, e.g., calling party numbers, etc. A keypad 930 enables dialing digits for voice and/or data calls as well as generating selection inputs, for example, as may be keyed-in by the user based on a displayed menu or as a cursor control and selection of a highlighted item on a displayed screen. The display 920 and keypad 930 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 930, display 920, microphone 940 and speaker 910 may be used as the physical input and output elements of the GUI, for multimedia (e.g. audio and/or video) communications. Of course other user interface elements may also be used, such as a stylus and touch sensitive display screen, as in a PDA or a smart phone.

A microprocessor 980 serves as a programmable controller for the wireless mobile device 900, in that it controls all operations of the wireless mobile device 900 in accordance with programming that it executes, for all normal operations, and for operations involved in selecting a preferred technology and selecting an available network of the appropriate technology type, for mobile communications. In the example, the wireless mobile device 900 includes flash type program memory 990, for storage of various "software" or "firmware" program routines and mobile configuration settings, such as a mobile directory number (MDN) and/or mobile identification number (MIN), etc. The wireless mobile device 900 may also include a non-volatile random access memory (RAM) 960 for a working data processing memory. Of course, other storage devices or configurations may be added to or substituted for those in the example. In a present implementation, the flash type program memory 990 may store firmware such as a boot routine, device driver software, an operating system, call processing software, and vocoder control software, and any of a wide variety of other applications, such as client browser software and short message service software. The memories 990 and 960 also store various data, such as telephone numbers and server addresses, downloaded data such as multimedia content, and various data input by the user. Programming 995, implemented to perform the algorithm for network assisted femto cell discovery, as disclosed herein, may be stored in the flash type program memory 990, sometimes referred to as "firmware," and may be loaded into and executed by the microprocessor 980.

Hence, aspects of the methods for switching between a cellular service network and a femto cell environment via network-assisted means and information or parameters used in such operations as discussed herein may be embodied in programming. The executable programs from such programming may be stored in the storage of the mobile device, such as RAM 960 or as a flash memory module 995 in the flash memory 990. The data stored with or separate from such programs for network-assisted discovery and switching between a cellular service network and a femto cell environment may include various lists related to the parameters or conditions configured for network handoffs, in accordance with the algorithm disclosed herein.

Program aspects of the technology may be thought of as "products" or "articles of manufacture" typically in the form of executable code and/or associated data that is carried on or embodied in a type of machine readable medium. "Storage" type media include any or all of the non-transitory, tangible memory of the computers, processors, mobile stations or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of software from a computer or processor into the mobile station to add or update the functionality to that device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, "storage" media relates to tangible, non-transitory media for storing programming and/or data, and unless restricted to such "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as the main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data, communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the broker implementation described above can be embodied in a hardware device, it can also be implemented as a software only solution—e.g., requiring installation on an existing server. In addition, it can also be implemented as a firmware, firmware/software combination, firmware/hardware combination, or hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method comprising the steps of:
    receiving, in a machine having at least one processor, storage, and a communication platform for a femto serving switch system, a request for registering a wireless mobile device within a femto cell environment;
    registering the wireless mobile device within the femto cell environment;
    obtaining information related to the femto cell environment and one or more applications that are supported by the femto cell environment;
    generating a femto discovery notification (FDN) based on the obtained information; and
    delivering the FDN to the wireless mobile device to assist the wireless mobile device to operate in the femto cell environment,
    wherein the FDN delivered to the wireless mobile device includes information about a plurality of femto cells in the femto cell environment and includes the obtained information about the one or more applications that are supported by the femto cell environment.

2. The method of claim 1, wherein:
    the obtained information includes the information about the plurality of femto cells in the femto cell environment, and
    the femto cells of the plurality are neighboring femto cells located in the femto cell environment.

3. The method of claim 1, wherein the obtained information includes at least one position of a femto cell in the femto cell environment or services available from the femto cell in the femto cell environment.

4. The method of claim 1, wherein the obtained information is related to the one or more applications and includes an indication as to the capabilities of at least one of the plurality of femto cells in the femto cell environment and an indication as to which of the one or more applications are supported by the at least one femto cell.

5. The method of claim 1, wherein the step of delivering comprises:
generating a message to be transmitted;
incorporating the FDN in the message; and
transmitting the message with the FDN to the wireless mobile device.

6. The method of claim 1, further comprising steps of:
detecting presence of the wireless mobile device in the femto cell environment; and
when the presence of the wireless mobile device is detected,
obtaining an identifier of the wireless mobile device,
generating the request for registering the wireless mobile device within the femto cell environment, and
transmitting the request to the femto serving switch system.

7. A method comprising the steps of:
receiving, in a machine having at least one processor, storage, and a communication platform for a femto serving switch system, from a femto support system, a femto discovery notification (FDN) directed to a wireless mobile device;
analyzing the received FDN to identify a femto cell environment;
obtaining information relating to the femto cell environment;
modifying the FDN based on the obtained information to generate an updated FDN; and
delivering, to the wireless mobile device, the updated FDN to assist the wireless mobile device to switch between a wireless network and the femto cell environment,
wherein the updated FDN delivered to the wireless mobile device includes information about a plurality of femto cells in the femto cell environment and includes information about one or more applications that are supported by the femto cell environment.

8. The method of claim 7, wherein:
the obtained information includes the information about the plurality of femto cells in the femto cell environment, and
the femto cells of the plurality are neighboring femto cells located in the femto cell environment.

9. The method of claim 7, wherein the obtained information includes information on one or more applications supported in the femto cell environment and includes an indication as to which of the one or more applications are supported by the at least one femto cell.

10. The method of claim 7, wherein the step of delivering comprises:
generating a message to be transmitted;
incorporating the updated FDN in the message; and
transmitting the message with the updated FDN to the wireless mobile device.

11. A method comprising the steps of:
receiving, in a machine having at least one processor, storage, and a communication platform for a femto support system, a request for registering a wireless mobile device with a femto cell environment;
identifying a femto serving switch system associated with the femto cell environment;
obtaining information related to the femto cell environment;
registering the wireless mobile device with the femto cell environment;
generating a femto discovery notification (FDN) based on the obtained information; and
delivering the FDN to the femto serving switch system for transmission to the wireless mobile device,
wherein the FDN delivered to the femto serving switch system for transmission to the wireless mobile device includes information about a plurality of femto cells in the femto cell environment and includes information about one or more applications that are supported by the femto cell environment.

12. The method of claim 11, wherein the obtained information includes information about a host femto cell with which the requested registration takes place.

13. The method of claim 11, wherein the step of delivering comprises:
generating a message to be transmitted;
incorporating the FDN in the message; and
transmitting the message with the FDN to the femto serving switch system.

14. A method comprising the steps of:
receiving in a wireless mobile device capable of operation in a first network environment and a second network environment a message from a femto serving switch system, where the message includes a femto discovery notification (FDN) with information indicating that the wireless mobile device is presently operating under the coverage of the second network environment;
analyzing information in the FDN related to one or more applications capable of running on the wireless mobile device under the coverage of the second network environment;
determining that the wireless mobile device is no longer operating in the first network environment; and
modifying the status of the one or more applications on the wireless mobile device in accordance with the information,
wherein the FDN received in the wireless mobile device includes information about a plurality of femto cells in the second network environment and includes the analyzed information about the one or more applications that are supported by the second network environment.

15. The method of claim 14, wherein the first network environment is a wireless network and the second network environment is a femto cell environment.

16. The method of claim 14, further comprising storing information included in the FDN that provides identification of one or more femto cells operating in a femto cell environment.

17. A femto serving switch system, comprising:
a receiver configured for receiving a request for registering a wireless mobile device within a femto cell environment;
a device registration unit configured for registering the wireless mobile device within the femto cell environment;
a femto discovery notification (FDN) generator configured for obtaining information related to the femto cell environment and one or more applications that are supported by the femto cell environment and generating an FDN based on the obtained information; and
a transmitter configured for delivering the FDN to the wireless mobile device to assist the wireless mobile device to operate in the femto cell environment, wherein the FDN delivered by the transmitter to the wireless mobile device includes information about a plurality of femto cells in the femto cell environment and includes the obtained information about the one or more applications that are supported by the femto cell environment.

18. The femto serving switch system of claim 17, further comprising a neighbor update unit configured for obtaining information related to the femto cell environment including the information about the plurality of femto cells located in the femto cell environment.

19. The femto serving switch system of claim 18, further comprising a position update unit configured for obtaining the information about femto cells in the femto cell environment including at least one position of a femto cell in the femto cell environment or services available from the femto cells in the femto cell environment.

20. The femto serving switch system of claim 17, further comprising an application update unit configured for obtaining information related to the one or more applications including an indication as to the capabilities of at least one of the plurality of femto cells in the femto cell environment and an indication as to which of the one or more applications are supported by the at least one femto cell.

21. A femto serving switch system, comprising:
a femto discovery notification (FDN) receiver configured for receiving, from a femto support system, an FDN directed to a wireless mobile device;
an FDN analyzer configured for analyzing the received FDN to identify a femto cell environment;
one or more information retrieval units configured for obtaining information relating to the femto cell environment;
an FDN modifier configured for modifying the FDN based on the obtained information to generate an updated FDN; and
a transmitter configured for delivering, to the wireless mobile device, the updated FDN to assist the wireless mobile device to switch between a wireless network and the femto cell environment,
wherein the updated FDN delivered by the transmitter to the wireless mobile device includes information about a plurality of femto cells in the femto cell environment and includes information about one or more applications that are supported by the femto cell environment.

22. The femto serving switch system of claim 21, wherein the one or more information retrieval units comprises:
a neighbor update unit configured for obtaining information related to the femto cell environment including the information about the plurality of femto cells in the femto cell environment;
a position update unit configured for obtaining the information about the femto cells in the femto cell environment including at least one position of a femto cell in the femto cell environment or services available from the femto cells in the femto cell environment; and
an application update unit configured for obtaining information related to the one or more applications including an indication as to the capabilities of at least one of the plurality of femto cells in the femto cell environment and an indication as to which of the one or more applications are supported by the at least one femto cell.

23. A femto support system, comprising:
a network interface configured for receiving a request for registering a wireless mobile device with a femto cell environment;
a femto switch identifier configured for identifying a femto serving switch system associated with the femto cell environment;
a femto cell identifier configured for obtaining information related to the femto cell environment;
a device registration unit configured for registering the wireless mobile device with the femto cell environment;
a femto discovery notification (FDN) generator configured for generating an FDN based on the obtained information; and
a transmitter configured for delivering the FDN to the femto serving switch system for transmission to the wireless mobile device,
wherein the FDN delivered by the transmitter to the femto serving switch system for transmission to the wireless mobile device includes information about a plurality of femto cells in the femto cell environment and includes information about one or more applications that are supported by the femto cell environment.

24. The femto support system of claim 23, further comprising an application update unit configured for obtaining information related to one or more applications that are capable of running on the wireless mobile device, which can be incorporated in the FDN.

25. A wireless mobile device, comprising:
a femto discovery notification (FDN) receiver configured for receiving a message from a femto serving switch system, where the message includes an FDN with information indicating that the wireless mobile device is presently operating under the coverage of a first network environment;
an FDN analyzer configured for analyzing information in the FDN related to one or more applications capable of running on the wireless mobile device under the coverage of the first network environment and determining that the wireless mobile device is no longer operating in a second network environment; and
a device interface controller configured for modifying the status of the one or more applications on the wireless mobile device in accordance with the information,
wherein the FDN received by the FDN receiver of the wireless mobile device includes information about a plurality of femto cells in the second network environment and includes information about one or more applications that are supported by the second network environment.

26. A machine readable and non-transitory medium having information recorded thereon for a femto serving switch system, where when the information is read by the machine, causes the machine to perform the following:
receive a request for registering a wireless mobile device within a femto cell environment;
register the wireless mobile device within the femto cell environment;
obtain information related to the femto cell environment and one or more applications that are supported by the femto cell environment;
generate a femto discovery notification (FDN) based on the obtained information; and
deliver the FDN to the wireless mobile device to assist the wireless mobile device to operate in the femto cell environment,
wherein the FDN delivered to the wireless mobile device includes information about a plurality of femto cells in the femto cell environment and includes the obtained information about the one or more applications that are supported by the femto cell environment.

27. A machine readable and non-transitory medium having information recorded thereon for a femto serving switch system, where when the information is read by the machine, causes the machine to perform the following:

receive, from a femto support system, a femto discovery notification (FDN) directed to a wireless mobile device;

analyze the received FDN to identify a femto cell environment;

obtain information relating to the femto cell environment;

modify the FDN based on the obtained information to generate an updated FDN; and deliver, to the wireless mobile device, the updated FDN to assist the wireless mobile device to switch between a wireless network and the femto cell environment, wherein the updated FDN delivered to the wireless mobile device includes information about a plurality of femto cells in the femto cell environment and includes information about one or more applications that are supported by the femto cell environment.

28. A machine readable and non-transitory medium having information recorded thereon for a femto support system, where when the information is read by the machine, causes the machine to perform the following:

receive a request for registering a wireless mobile device with a femto cell environment;

identify a femto serving switch system associated with the femto cell environment;

obtain information related to the femto cell environment;

register the wireless mobile device with the femto cell environment;

generate a femto discovery notification (FDN) based on the obtained information; and deliver the FDN to the femto serving switch system for transmission to the wireless mobile device, wherein the FDN delivered to the femto serving switch system for transmission to the wireless mobile device includes information about a plurality of femto cells in the femto cell environment and includes information about one or more applications that are supported by the femto cell environment.

29. A machine readable and non-transitory medium having information recorded thereon for a wireless mobile device, where when the information is read by the machine, causes the machine to perform the following:

receive a message from a femto serving switch system, where the message includes a femto discovery notification (FDN) with information indicating that the device is presently operating under the coverage of a first network environment;

analyze information in the FDN related to one or more applications capable of running on the wireless mobile device under the coverage of the first network environment;

determine that the wireless mobile device is no longer operating in a second network environment; and modify the status of the one or more applications on the wireless mobile device in accordance with the information, wherein the received FDN includes information about a plurality of femto cells in the second network environment and includes information about one or more applications that are supported by the second network environment.

* * * * *